(12) United States Patent
Chung et al.

(10) Patent No.: US 8,024,624 B2
(45) Date of Patent: Sep. 20, 2011

(54) SYSTEM AND METHOD FOR COMMUNICATING DATA OVER COMMUNICATION CHANNELS

(75) Inventors: Hoe-Ju Chung, Gyeonggi-do (KR); Jae-Kwan Kim, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1048 days.

(21) Appl. No.: 11/850,702

(22) Filed: Sep. 6, 2007

(65) Prior Publication Data
US 2008/0069145 A1  Mar. 20, 2008

(30) Foreign Application Priority Data

Sep. 14, 2006  (KR) .................. 10-2006-0089153

(51) Int. Cl.
*G06F 11/00* (2006.01)
(52) U.S. Cl. ........................ 714/701; 370/476
(58) Field of Classification Search ........... 340/12.21, 340/10.51; 710/105; 375/233, 150; 714/718, 714/709, 701; 370/476
See application file for complete search history.

(56) References Cited

U.S. PATENT DOCUMENTS

| | | | | |
|---|---|---|---|---|
| 4,694,293 A | * | 9/1987 | Sugiyama et al. | 340/12.21 |
| 5,028,918 A | * | 7/1991 | Giles et al. | 340/10.51 |
| 5,412,783 A | * | 5/1995 | Skokan | 710/105 |
| 7,412,000 B1 | * | 8/2008 | Sailaja et al. | 375/233 |
| 7,593,456 B2 | * | 9/2009 | Sailaja et al. | 375/150 |

FOREIGN PATENT DOCUMENTS

| | | |
|---|---|---|
| JP | 58-060497 | 9/1983 |
| JP | 59-104799 | 6/1984 |
| KR | 1020010017413 A | 5/2001 |

* cited by examiner

*Primary Examiner* — David Ton
(74) *Attorney, Agent, or Firm* — Volentine & Whitt, PLLC

(57) ABSTRACT

A communication system communication system includes a transmitter and a receiver. The transmitter inverts multiple bits of first transmission data, serializes the first transmission data to generate second transmission data, and provides the second transmission data to communication channels, in response to an error signal. The receiver inverts multiple bits of first reception data provided from the communication channels, parallelizes the first reception data to generate second reception data, and generates the error signal based on the second reception data, in response to the error signal.

32 Claims, 16 Drawing Sheets

```
ICD0  1  1  1  0  1  1  1  0  0  0  0
ICD1  0  0  0  0  0  1  1  0  0  0  0
ICD2  1  1  1  1  1  0  0  1  1  1  1
ICD3  1  1  1  1  1  0  1  0  1  1  1
```

FIG. 7

```
           71 72 73   74 75
IBD0  0  1  (0)(0)(0) 1  [0][0] 1  0  1  0
IBD1  1  0  1  0  1  1  [0][0] 1  0  1  0
IBD2  0  1  0  1  0  0  [1][1] 0  1  0  1
IBD3  0  1  0  1  0  0  [0][0] 0  1  0  1
```

SYSTEM AND METHOD FOR COMMUNICATING DATA OVER COMMUNICATION CHANNELS

CROSS-REFERENCE TO RELATED APPLICATIONS

A claim of priority is made to Korean Patent Application No. 10-2006-0089153, filed on Sep. 14, 2006, the subject matter of which is hereby incorporated by reference.

BACKGROUND OF THE INVENTION

1. Field of the Invention

The present invention relates to a data communication system, and more particularly, to a system and method for communicating data over communications channels.

2. Description of the Related Art

FIG. 1 is a diagram illustrating a conventional communication system. Referring to FIG. 1, the communication system 5 includes a transmitter 10, a receiver 20, and communication channels CH1 through CH4. Data DO00 through DO03 of the transmitter 10 are transmitted to the receiver 20 through the communication channels CH1 through CH4.

FIG. 2 is a schematic diagram illustrating an environment in which simultaneous switching noise (SSN) occurs during data communication between two semiconductor memory devices. Referring to FIG. 2, a first semiconductor memory device 30 (memory device 1) operates as a transmitter, and a second semiconductor memory device 40 (memory device 2) operates as a receiver. The first semiconductor memory device 30 includes output drivers 31 through 34 operating at a high power supply voltage VDDQ and a low power supply voltage VSSQ. The second semiconductor memory device 40 includes input drivers 41 through 44 operating at the high power supply voltage VDDQ and the low power supply voltage VSSQ.

FIG. 3 is a schematic diagram illustrating an environment in which inter-symbol interference (ISI) occurs during the data communication between the two semiconductor memory devices. In FIG. 3, the communication channel CH2 of the communication channels CH1 through CH4 in FIG. 2 is illustrated, and data D1 passes through the communication channel CH2. Parasitic capacitance CCH exists between the ground and the communication channel CH2 disposed outside of a semiconductor chip. The parasitic capacitances CCH also exist between the ground and the communication channels CH1, CH3 and CH4.

FIG. 4 is a diagram illustrating data affected by ISI and SSN during transmission through four communication channels, and the data include bits highly susceptible to errors. Referring to FIGS. 2 and 4, each of the four data D0-D3 includes nine bits, which are sequentially transmitted through the communication channels CH1 through CH4. The data D0 is transmitted through the communication channel CH1, the data D1 is transmitted through the communication channel CH2, the data D2 is transmitted through the communication channel CH3, and the data D3 is transmitted through the communication channel DH4, respectively. A reference numeral 51 corresponds to a data bit susceptible to errors affected by ISI. A reference numeral 52 corresponds to data bits susceptible to errors affected by SSN.

Referring to FIGS. 3 and 4, a state of the data D1 changes from a second bit "0" to a third bit "1", and then from the third bit "1" to a fourth bit "0" as indicated by the reference numeral 51. A voltage of the third bit "1" is not high enough to be recognized as a logic high when the state of the data D1 changes from 0 to 1 to 0 because the communication channels have the parasitic capacitances, as indicated in FIG. 3. Also, a voltage of "0" is not low enough to be recognized as a logic low when the state of the data D1 changes from 1 to 0 to 1. This phenomenon is referred to as ISI.

Referring to FIGS. 2 and 4, a state of the data D0 changes from "1" to "0" while states of the data D1 through D3 change from "0" to "1", as indicated by the reference numeral 52. The output driver 31 connected to the communication channel CH1 may output "1" instead of "0" in a first row shown by the reference number 52, when the data D0 transmitted through the communication channel CH1 changes from "1" to "0" and the states of the data D1 through D3 transmitted through the communication channels CH2 through CH4 change from "0" to "1" in the second through fourth rows, as indicated by the reference numeral 52. This phenomenon is referred to as SSN.

Further Bit Error Rate (BER) during transmission through communication channels between semiconductor chips increases as a communication between the semiconductor chips becomes faster. Accordingly, there exists a probability of error occurrence caused by ISI and SSN.

SUMMARY OF THE INVENTION

Embodiments of the present invention provide a communication system, a memory system and a method that efficiently reduces a probability of error occurrence during transmission by using a partial data inversion. Accordingly, the communication system according to exemplary embodiments of the present invention may reduce errors caused by ISI and SSN.

An aspect of the present invention provides a communication system that includes a transmitter and a receiver. The transmitter inverts multiple first bits of first transmission data, serializes the first transmission data to generate second transmission data, and provides the second transmission data to communication channels, in response to an error signal. The receiver inverts multiple first bits of first reception data provided from the communication channels, parallelizes the first reception data to generate second reception data, and generates the error signal based on the second reception data, in response to the error signal.

The transmitter may include a first inversion signal generating circuit to generate a first inversion signal in response to the error signal, and a serializing circuit to invert the multiple first bits of the first transmission data, and to serialize the first transmission data to generate the second transmission data based on the inverted multiple first bits and multiple non-inverted second bits of the first transmission data, in response to the error signal. The first transmission data may correspond to parallel data that are sequentially transmitted through multiple data lines. The serializing circuit may invert odd-numbered and even-numbered bits of data transmitted through odd-numbered data lines of the multiple data lines and invert odd-numbered bits of data transmitted through each of the data lines, in response to the first inversion signal.

The first transmission data may include sixteen data that are transmitted through the data lines, and the second transmission data may include four data that are transmitted through the communication channels. Each of the sixteen data may include one bit, and each of the four data may include four bits.

The serializing circuit may sequentially output the second transmission data in response to a transmission clock signal. Also, the serializing circuit may include multiple serializers. A first serializer may serialize first through fourth data of the first transmission data provided from first through fourth data lines to generate first data of the second transmission data in response to the first inversion signal and the transmission clock signal. A second serializer may serialize fifth through eighth data of the first transmission data provided from fifth through eighth data lines to generate second data of the second transmission data in response to the first inversion signal and the transmission clock signal. A third serializer may serialize ninth through twelfth data of the first transmission data provided from ninth through twelfth data lines to generate third data of the second transmission data in response to the first inversion signal and the transmission clock signal. A fourth serializer may serialize thirteenth through sixteenth data of the first transmission data provided from the thirteenth through sixteenth data lines to generate fourth data of the second transmission data in response to the first inversion signal and the transmission clock signal. The first through fourth serializers may include transmission circuits that invert data in response to the first inversion signal.

The first inversion signal may transit synchronously with edges of the error signal. Also, the first inversion signal generating circuit may include a flip-flop, which may include an input terminal, a clock terminal receiving the error signal, an output terminal providing the first inversion signal, and a complementary output terminal providing an inverted first inversion signal. The input terminal and the complementary output terminal may be electrically connected to each other.

The receiver of the communication system may include a cyclic redundancy check (CRC) checker to check a CRC code based on the second reception data and to generate the error signal, and a second inversion signal generating circuit to generate a second inversion signal in response to the error signal. The receiver may also include a parallelizing circuit configured to invert the multiple first bits of the first reception data, and to parallelize the first reception data to generate the second reception data based on the inverted multiple first bits and non-inverted multiple second bits of the first reception data, in response to the error signal. The first reception data may correspond to serial data that are sequentially transmitted through the communication channels.

The parallelizing circuit may be configured to invert odd-numbered bits of data transmitted through each of the communication channels and to invert all bits of data transmitted through odd-numbered communication channels of the communication channels, in response to the second inversion signal. The parallelizing circuit may also output the second reception data in response to a reception clock signal. The first reception data may include four data that are transmitted through four communication channels and the second reception data may include sixteen data that are transmitted through sixteen output data lines. Each of the four data may include four bits, and each the sixteen data may include one bit.

The parallelizing circuit may further include multiple parallelizers. A first parallelizer may parallelize first data of the first reception data provided from a first channel of the communications channels to generate first through fourth data of the second reception data in response to the second inversion signal and the reception clock signal. A second parallelizer may parallelize second data of the first reception data provided from a second channel to generate fifth through eighth data of the second reception data in response to the second inversion signal and the reception clock signal. A third parallelizer may parallelize third data of the first reception data provided from a third channel to generate ninth through twelfth data of the second reception data in response to the second inversion signal and the reception clock signal. A fourth parallelizer may parallelize fourth data of the first reception data provided from a fourth channel to generate thirteenth through sixteenth data of the second reception data in response to the second inversion signal and the reception clock signal. The first through fourth parallelizers may further include transmission circuits that invert data in response to the second inversion signal. Also, the second inversion signal may transit synchronously with edges of the error signal.

The second inversion signal generating circuit may include a flip-flop. The flip-flop may include an input terminal, a clock terminal receiving the error signal, an output terminal providing the second inversion signal, and a complementary output terminal providing an inverted second inversion signal. The input terminal and the complementary output terminal may be electrically connected.

Another aspect of the present invention provides a memory system, including a memory device and a memory controller. The memory device is configured to invert multiple first bits of first transmission data, to serialize the first transmission data to generate second transmission data, and to provide the second transmission data to multiple communication channels, in response to an error signal. The memory controller is configured to invert multiple first bits of first reception data provided from the communication channels, to parallelize the first reception data to generate second reception data, and to generate the error signal based on the second reception data, in response to the error signal.

The memory device may include a first inversion signal generating circuit configured to generate a first inversion signal in response to the error signal, and a serializing circuit configured to invert the multiple first bits of the first transmission data, and to serialize the first transmission data to generate the second transmission data based on the inverted multiple first bits and non-inverted multiple second bits of the first transmission data, in response to the error signal.

The first transmission data may correspond to parallel data that are sequentially transmitted through multiple data lines. Also, the serializing circuit may invert odd- and even-numbered bits of data transmitted through odd-numbered data lines and may invert odd-numbered bits of data transmitted through each of the data lines, in response to the first inversion signal.

The memory device may further include a memory core and an output buffer. The memory core may generate the first transmission data to provide the first transmission data to the serializing circuits. The output buffer may provide the second transmission data to the communication channels by buffering the second transmission data.

The memory controller may include a CRC checker to check a CRC code based on the second reception data and to generate the error signal, and a second inversion signal generating circuit to generate a second inversion signal in response to the error signal. The memory controller may also include a parallelizing circuit to invert the multiple first bits of the first reception data, and to parallelize the first reception data to generate the second reception data based on the inverted multiple first bits and non-inverted multiple second bits of the first reception data, in response to the error signal. In addition, the memory controller may include an input buffer to provide the first reception data to the parallelizing circuits by buffering data provided from the communication channels, as well as a memory controller core to perform data processing based on the second reception data and to generate control signals for controlling the memory device.

The first reception data may correspond to serial data that are sequentially transmitted through the communication channels. The parallelizing circuit may invert odd-numbered bits of data transmitted through each of the communication channels and invert odd- and even-numbered data transmitted through odd-numbered communication channels of the communication channels, in response to the second inversion signal. The parallelizing circuit may output the second reception data in response to a reception clock signal.

Yet another aspect of the present invention provides a method of controlling a communication system. The method includes generating a first inversion signal and a second inversion signal in response to an error signal; inverting multiple bits of first transmission data in response to the first inversion signal; generating second transmission data that are serialized based on at least the inverted multiple bits and non-inverted multiple bits of the first transmission data; and providing the second transmission data to multiple communication channels. The method further includes receiving first reception data from the communication channels; inverting multiple bits of the first reception data in response to the second inversion signal; generating second reception data that are parallelized based on at least the inverted multiple bits and non-inverted multiple bits of the first reception data; and generating the error signal based on the second reception data.

BRIEF DESCRIPTION OF THE DRAWINGS

The embodiments of the present invention will be described with reference to the attached drawings, in which:

FIG. 4 is a diagram illustrating data including bits susceptible to errors during transmission through four communication channels.

FIGS. 5 through 7 are schematic diagrams illustrating data conversion steps for preventing errors, according to exemplary embodiments of the present invention.

DETAILED DESCRIPTION OF THE EMBODIMENTS

Figure 1:
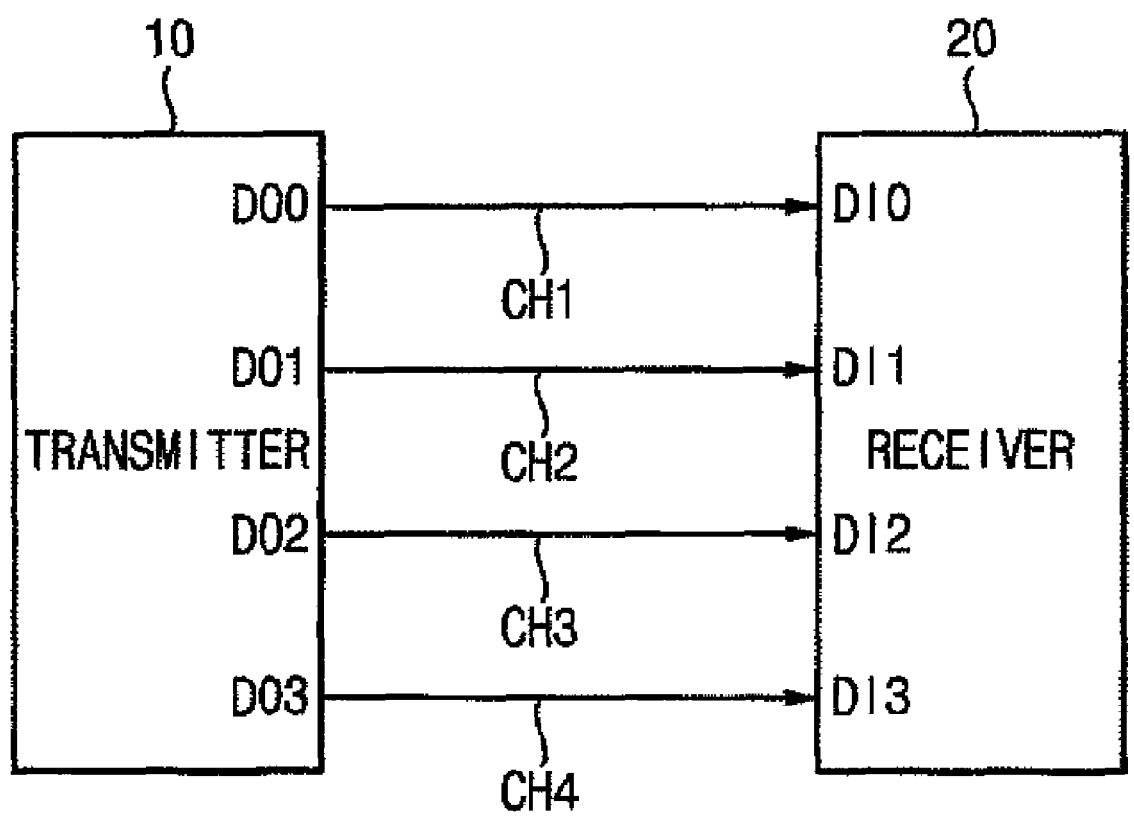
FIG. 1 is a diagram illustrating a conventional communication system.

Embodiments of the present invention now will be described more fully with reference to the accompanying drawings, in which embodiments of the invention are shown. The invention may, however, be embodied in many different forms and should not be construed as being limited to the illustrated embodiments set forth herein. Rather, these embodiments are provided as examples, to convey the concept of the invention to one skilled in the art. Accordingly, known processes, elements, and techniques are not described with respect to some of the embodiments of the present invention. Throughout the drawings and written description, like reference numerals refer to like elements throughout this application.

It is understood that, although the terms first, second, etc., may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It is further understood that terms, such as those defined in commonly used dictionaries, should be interpreted as having meanings that are consistent with their meanings in the context of the relevant art and should not be interpreted in an idealized or overly formal sense, unless expressly so defined herein.

FIGS. 5 through 7 are schematic diagrams illustrating data conversion steps for preventing errors from occurring in data, e.g., errors caused from the affects of inter-symbol interference (ISI) and simultaneous switching noise (SSN), according to embodiments of the present invention.

Figure 2:
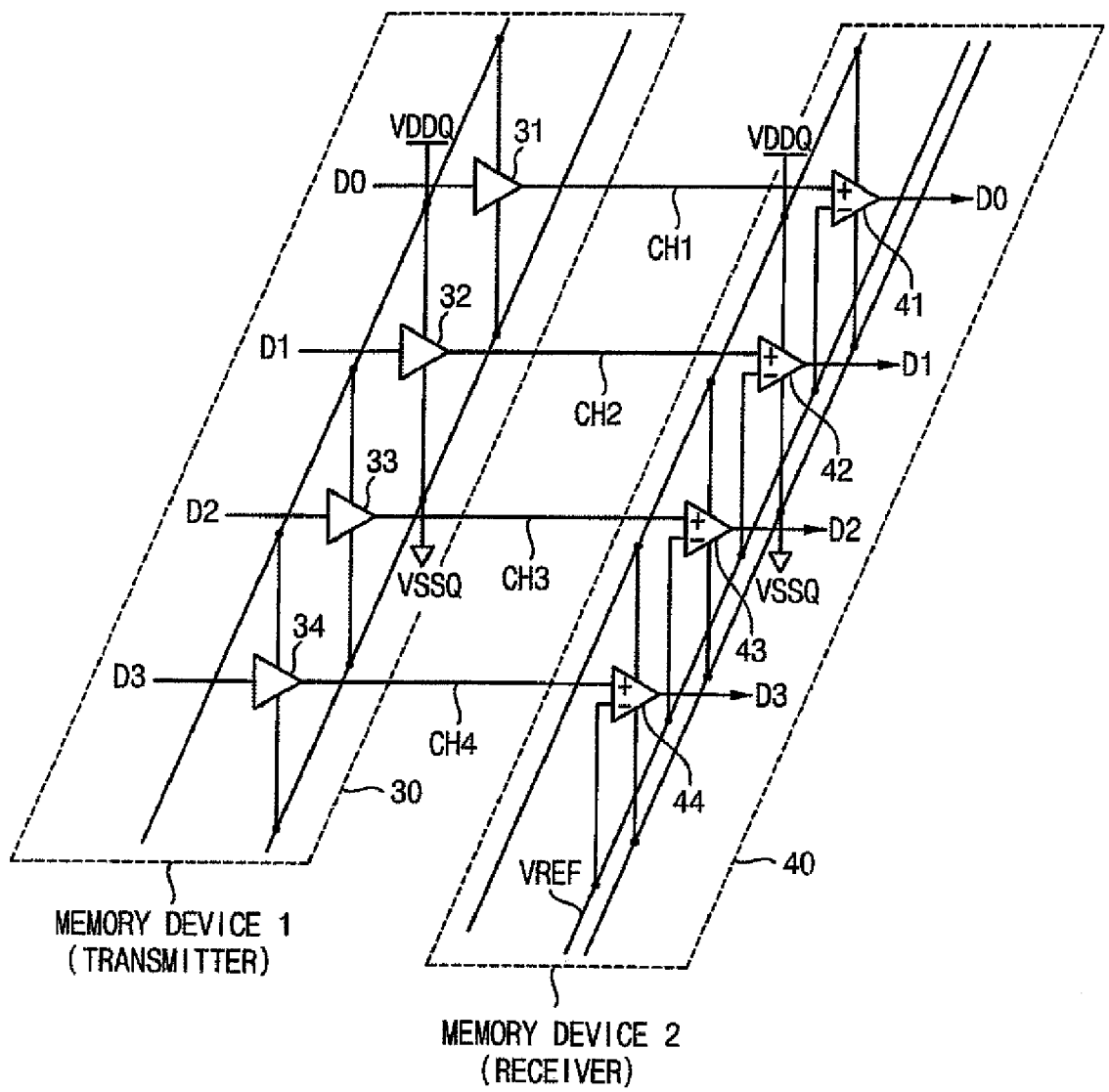
FIG. 2 is a schematic diagram illustrating an environment in which simultaneous switching noise (SSN) occurs during data communication between two semiconductor memory devices.
Figure 3:
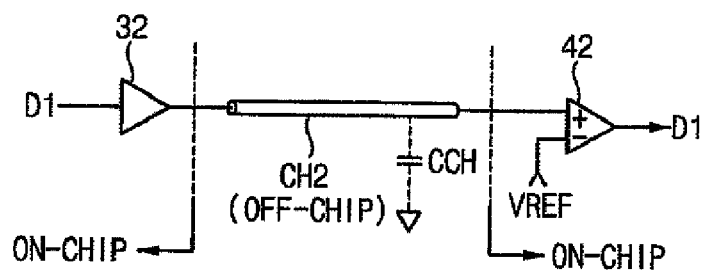
FIG. 3 is a schematic diagram illustrating an environment in which inter-symbol interference (ISI) occurs during data communication between the two semiconductor memory devices.

Referring to FIG. 5, twelve bits of each of four data D0-D3 are sequentially transmitted through four communication channels CH1 through CH4 (e.g., indicated in FIG. 2). The data D0 is transmitted through the communication channel CH1, the data D1 is transmitted through the communication channel CH2, the data D2 is transmitted through the communication channel CH3, and the data D3 is transmitted through the communication channel DH4. As discussed above, a fourth bit shown by reference numeral 62 is susceptible to errors affected by ISI, and an eighth bit of a first row shown by reference numeral 65 is susceptible to errors affected by SSN.

Referring to FIG. 6, all bits (odd- and even-numbered) of the data D0 and D2 in FIG. 5, which are transmitted through the odd-numbered channels CH1 and CH3, have been inverted, and the inverted data D0 and D2 respectively correspond to ICD0 and ICD2 in FIG. 6. All bits of the data D1 and D3 in FIG. 5, which are transmitted through the even-numbered channels CH2 and CH4, have not been inverted, and the non-inverted data D1 and D3 correspond to ICD1 and ICD3 in FIG. 6.

Referring to FIG. 7, the odd-numbered bits of each of the data ICD0 through ICD3 (FIG. 6) transmitted through the channels CH1 through CH4, respectively, have been inverted, and the even-numbered bits of each of the data ICD0 through ICD3 (FIG. 6) have not been inverted. The resulting inversions are depicted as data IBD0 through IBD3 in FIG. 7.

In FIG. 7, a fourth bit "0" of the data IBD0, shown by the reference numeral 72, is not affected by ISI, unlike the fourth bit "1" of the data D0, shown by the reference numeral 62 in FIG. 5. More particularly, the probability of errors affected by ISI is high in FIG. 5 because the states of the bits indicted by reference numerals 61 through 63 change from 0 to 1 to 0. However, the probability of errors affected by ISI is low in FIG. 7 after the conversion because the states of the bits indicated by reference numbers 71 through 73 do not change, but rather each state is 0.

Additionally, an eighth bit "0" of the data IBD0 in a first row shown by a reference numeral 75 is not affected by SSN, unlike the eighth bit "1" of the data D0 in a first row shown by the reference numeral 65 in FIG. 5. More particularly, the probability of errors affected by SSN is high in FIG. 5 because the states of the bits of the data D0 in the first row, shown by the reference numerals 64 and 65, change from 0 to 1, while the states of the bits of the data D1 through D3 in the second to fourth rows, shown by the reference numerals 64 and 65, change from 1 to 0. However, the probability of errors affected by SSN is low after the conversion steps, indicated by FIG. 7, because the states of the bits of the data IBD0, IBD1 and IBD3 in the first, second and fourth rows of the reference numerals 74 and 75 do not change (each state is 0), and the states of bits of the data IBD2 in the third row of the reference numerals 74 and 75 likewise do not change (each state is 1).

Accordingly, the probability of errors affected by ISI and SSN is reduced by inverting bits of data transmitted through odd-numbered communication channels and by inverting odd-numbered bits of each data transmitted through all of the communication channels. In other words, bits transmitted through every other communication channel and every other bit transmitted through each communication channel are inverted.

Figure 8:
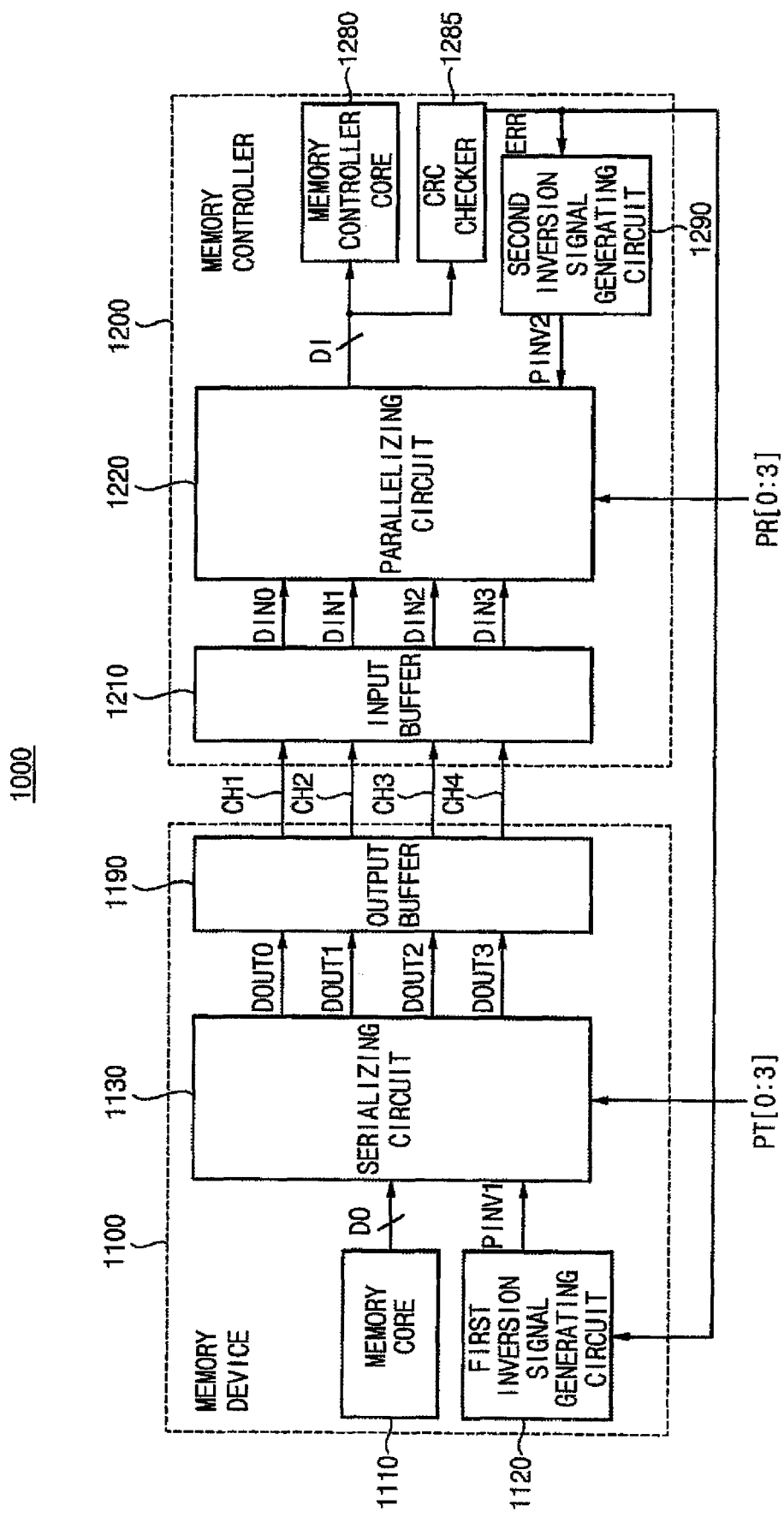
FIG. 8 is a block diagram illustrating a semiconductor memory system, according to an exemplary embodiment of the present invention.

FIG. 8 is a block diagram illustrating a semiconductor memory system according to an exemplary embodiment of the present invention. Referring to FIG. 8, the semiconductor memory system 1000 includes a memory device or transmitter 1100 and a memory controller or receiver 1200.

The memory device 1100 inverts a portion of the bits (i.e., partial bits) of first transmission data DO and serializes the converted first transmission data, including the inverted bits and non-inverted bits of the first transmission data DO, to provide second transmission data DOUT0 through DOUT3 to communication channels CH1 through CH4, in response to an error signal ERR. The memory controller 1200 inverts partial bits of first reception data DIN0 through DIN3 provided from the communication channels CH1 through CH4, and parallelizes converted first reception data, including the inverted bits and non-inverted bits of the first reception data DIN0 through DIN3 to generate second reception data DI, in response to the error signal ERR. Additionally, the memory controller 1200 generates the error signal ERR.

More particularly, the memory device 1100 includes a first inversion signal generating circuit 1120 and a serializing circuit 1130. The first inversion signal generating circuit 1120 generates a first inversion signal PINV1 in response to the error signal ERR, received from the memory controller 1200. The serializing circuit 1130 inverts the partial bits of the first transmission data DO and serializes the converted first transmission data, including the inverted bits and the non-inverted bits of the first transmission data DO, to generate the second transmission data DOUT0 through DOUT3, which are serialized, in response to a transmission clock signal PT[0:3] and the first inversion signal PINV1.

Additionally, the memory device 1100 includes a memory core 1110 and an output buffer 1190. The memory core 1110 includes a memory cell array (not illustrated), and provides the first transmission data DO to the serializing circuit 1130 based on data provided from the memory cell array. The output buffer 1190 buffers the second transmission data DOUT0 through DOUT3 to provide the buffered second transmission data DOUT0 through DOUT3 to the communication channels CH1 through CH4, respectively.

The memory controller 1200 includes a cyclic redundancy check (CRC) checker 1285, a second inversion signal generating circuit 1290, and a parallelizing circuit 1220. The CRC checker 1285 checks a CRC code based on the second reception data DI and generates the error signal ERR in respect to detected error. The second inversion signal generating circuit 1290 generates a second inversion signal PINV2 in response to the error signal ERR. The parallelizing circuit 1220 inverts the partial bits of the first reception data DIN0 through DIN3, provided from the communication channels CH1 through CH4, and parallelizes converted first reception data, including the inverted bits and the non-inverted bits of the first reception data DIN0 through DIN3, to generate parallelized second reception data DI, in response to a reception clock signal PR[0:3] and the second inversion signal PINV2.

Additionally, the memory controller 1200 includes an input buffer 1210 and a memory controller core 1280. The input buffer 1210 buffers the data received through the communication channels CH1 through CH4 to provide the first reception data DIN0 through DIN3 to the parallelizing circuit 1220. The memory controller core 1280 performs data processing on the second reception data DI and generates control signals for the memory device 1100.

An operation of the semiconductor memory system 1000 in FIG. 8 will now be explained.

The first transmission data DO provided from the memory core 1110 are parallel data. For example, the first transmission data DO may include sixteen data that are synchronously transmitted to the serializing circuit 1130 through sixteen data lines.

In an embodiment, a circuit structure of the first inversion signal generating circuit 1120 in the memory device 1100 may be the same as a circuit structure of the second inversion signal generating circuit 1290 in the memory controller 1200. The first inversion signal generating circuit 1120 and the second inversion signal generating circuit 1290 respectively generate the first inversion signal PINV1 and the second inversion signal PINV2, in response to the error signal ERR.

The serializing circuit 1130 inverts the partial bits of the first transmission data DO and serializes the converted first transmission data, including the inverted bits and the non-inverted bits of the first transmission data DO, to generate the second transmission data DOUT0 through DOUT3, which are serialized data, in response to a transmission clock signal PT[0:3] and the first inversion signal PINV1. The first and second inversion signals are enabled based on the error signal ERR provided by the CRC checker 1285 when the second reception data DI have errors, and a conversion operation according to embodiments of the present invention follows.

The probability of errors in the reception data received by a receiver is low when a transmitter uses a partial data inversion technology based on transmission data before transmitting the transmission data. For example, the transmitter may invert data transmitted through odd-numbered communication channels and may invert odd-numbered data of the data transmitted through all communication channels. Accordingly, a communication system using the partial data inversion technology, as illustrated in FIG. 8, may reduce the probability of errors caused by ISI and SSN.

Figure 9:
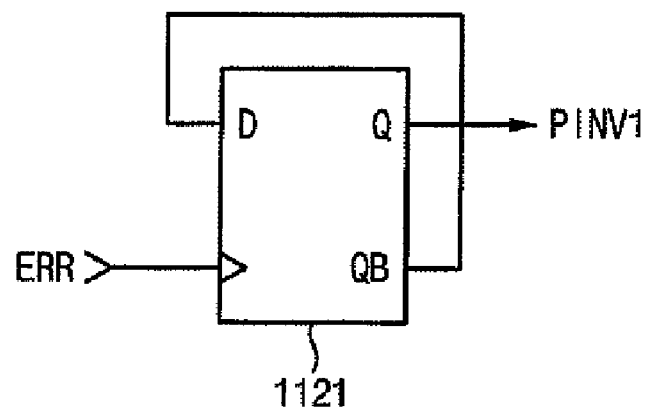
FIG. 9 is a circuit diagram illustrating an example of a first inversion signal generating circuit included in the semiconductor memory system in FIG. 8, according to an exemplary embodiment of the present invention.
Figure 10:
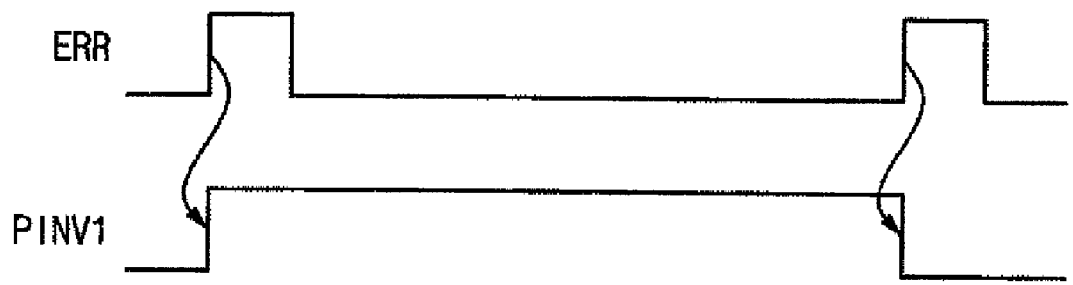
FIG. 10 is a timing diagram illustrating an operation of the first inversion signal generating circuit of FIG. 9, according to an exemplary embodiment of the present invention.

FIG. 9 is a circuit diagram illustrating an example of the first inversion signal generating circuit 1120 included in the semiconductor memory system in FIG. 8, according to an exemplary embodiment of the present invention. FIG. 10 is a timing diagram illustrating an operation of the first inversion signal generating circuit 1120, according to an exemplary embodiment of the present invention.

Referring to FIG. 9, the first inversion signal generating circuit 1120 includes a flip-flop 1121. The flip-flop 1121 has an input terminal D, a clock terminal that receives the error signal ERR, an output terminal Q that outputs the first inversion signal PIVN1, and a complementary output terminal QB that outputs the inverted first inversion signal. The input terminal D and the complementary output terminal QB are electrically connected to each other. Referring to FIG. 10, the first inversion signal PIVN1 transits synchronously with edges of the error signal ERR.

In an embodiment, the circuit structure of the second inversion signal generating circuit 1290 in the memory controller 1200 may be same as the circuit structure of the first inversion signal generating circuit 1120 in the memory device 1100. Additionally, a waveform of the first inversion signal PIVN1 may be same as a waveform of the second inversion signal PIVN2.

Figure 11:
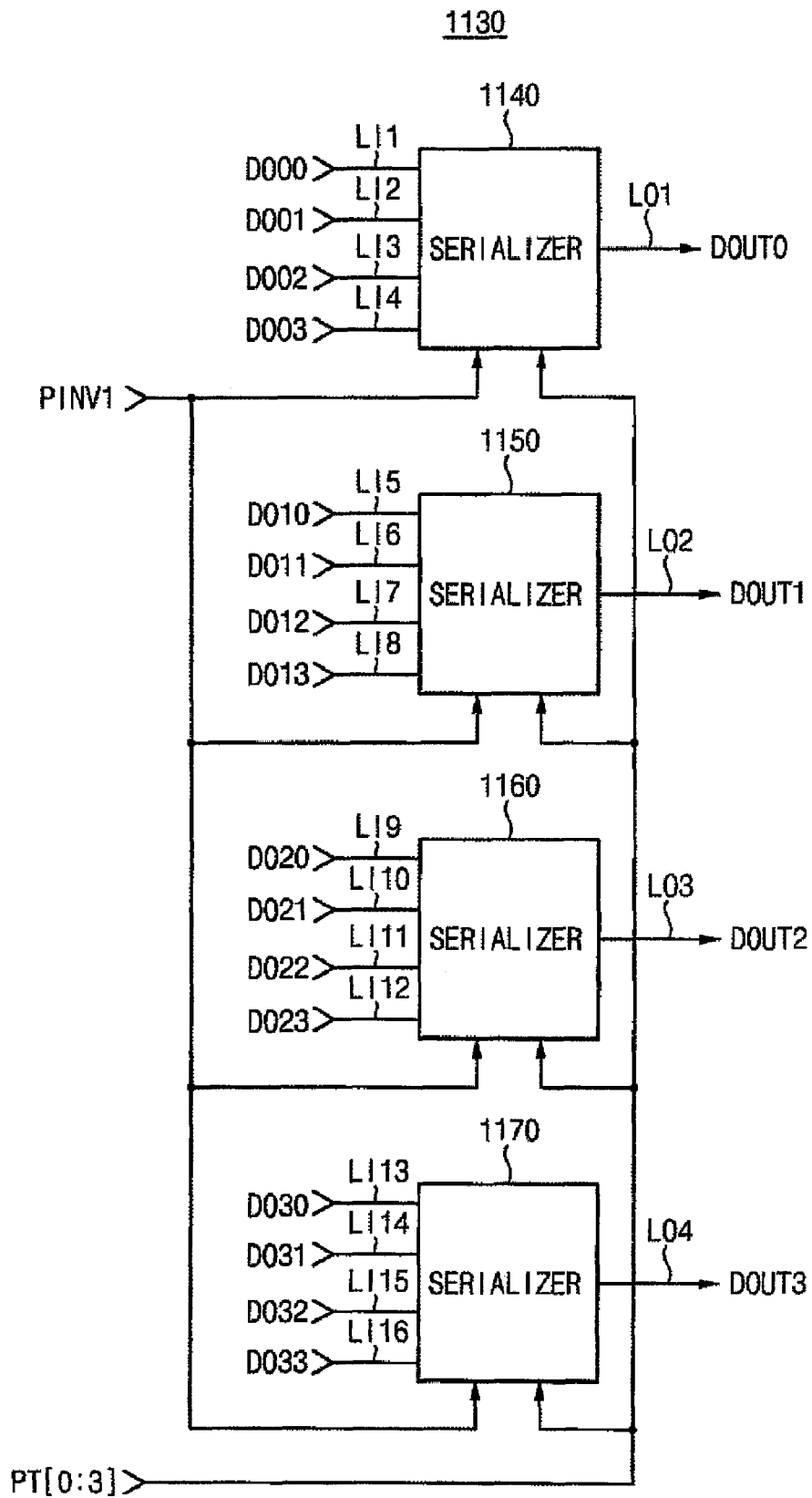
FIG. 11 is a block diagram illustrating an example of a serializing circuit included in the semiconductor memory system in FIG. 8, according to an exemplary embodiment of the present invention.

FIG. 11 is a block diagram illustrating an example of the serializing circuit 1130 included in the semiconductor memory system 1000 in FIG. 8, according to an exemplary embodiment of the present invention. Referring to FIG. 11, the serializing circuit 1130 includes first through fourth serializers 1140, 1150, 1160 and 1170.

The first serializer 1140 serializes first through fourth data DO00 through DO03 of the first transmission data provided from the first through fourth data lines LI1 through LI4 to generate first data DOUT0 of the second transmission data, in response to the first inversion signal PINV1 and the transmission clock signal PT[0:3]. The first data DOUT0 of the second transmission data is output through a first output data line LO1.

The second serializer 1150 serializes fifth through eighth data DO10 through DO13 of the first transmission data provided from the fifth through eighth data lines LI5 through LI8 to generate second data DOUT1 of the second transmission data, in response to the first inversion signal PINV1 and the transmission clock signal PT[0:3]. The second data DOUT1 is output through second output data line LO2.

The third serializer 1160 serializes ninth through twelfth data D020 through D023 of the first transmission data provided from ninth through twelfth data lines LI9 through LI12 to generate third data DOUT2 of the second transmission data, in response to the first inversion signal PINV1 and the transmission clock signal PT[0:3]. The third data DOUT2 is output through third output data line LO3.

The fourth serializer 1170 serializes thirteenth through sixteenth data DO30 through DO33 of the first transmission data provided from the thirteenth through sixteenth data lines LI13 through LI16 to generate fourth data DOUT3 of the second transmission data, in response to the first inversion signal PINV1 and the transmission clock signal PT[0:3]. The fourth data DOUT3 is output through fourth output data line LO4.

FIGS. 12 through 15 are circuit diagrams respectively illustrating examples of the serializers 1140, 1150, 1160 and 1170 in the serializing circuit 1130 of FIG. 11, according to embodiments of the present invention.

Figure 12:
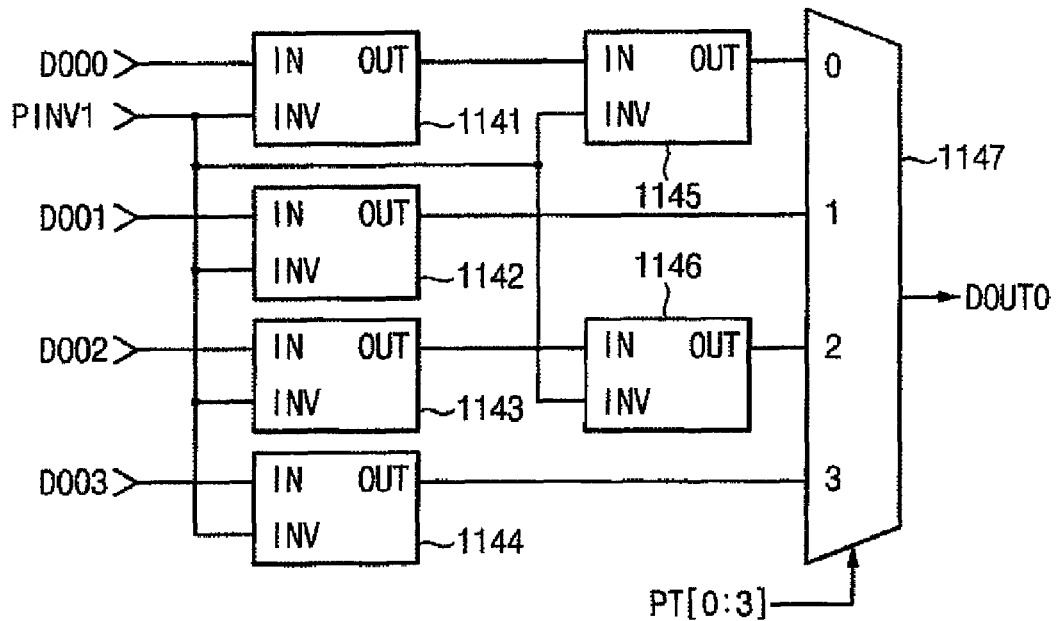
FIGS. 12 through 15 are circuit diagrams illustrating examples of serializers in the serializing circuit of FIG. 11, according to exemplary embodiments of the present invention.

Referring to FIG. 12, the first serializer 1140 includes first through sixth transmission circuits 1141 through 1146 and a selection circuit 1147. The first transmission circuit 1141 inverts the first data DO00 to output first output data in response to the first inversion signal PINV1. The second transmission circuit 1142 inverts the second data DO01 to output second output data in response to the first inversion signal PINV1. The third transmission circuit 1143 inverts the third data DO02 to output third output data in response to the first inversion signal PINV1. The fourth transmission circuit 1144 inverts the fourth data DO03 to output fourth output data in response to the first inversion signal PINV1. The fifth transmission circuit 1145 inverts the first output data (from the first transmission circuit 1141) to output fifth output data, in response to the first inversion signal PINV1. The sixth transmission circuit 1146 inverts the third output data (from the third transmission circuit 1143) to output sixth output data, in response to the first inversion signal PINV1. The selection circuit 1147 sequentially outputs the fifth output data, the second output data, the sixth output data and the fourth output data, in response to the transmission clock signal PT[0:3]. The selection circuit 1147 may be implemented by a multiplexer.

Figure 13:
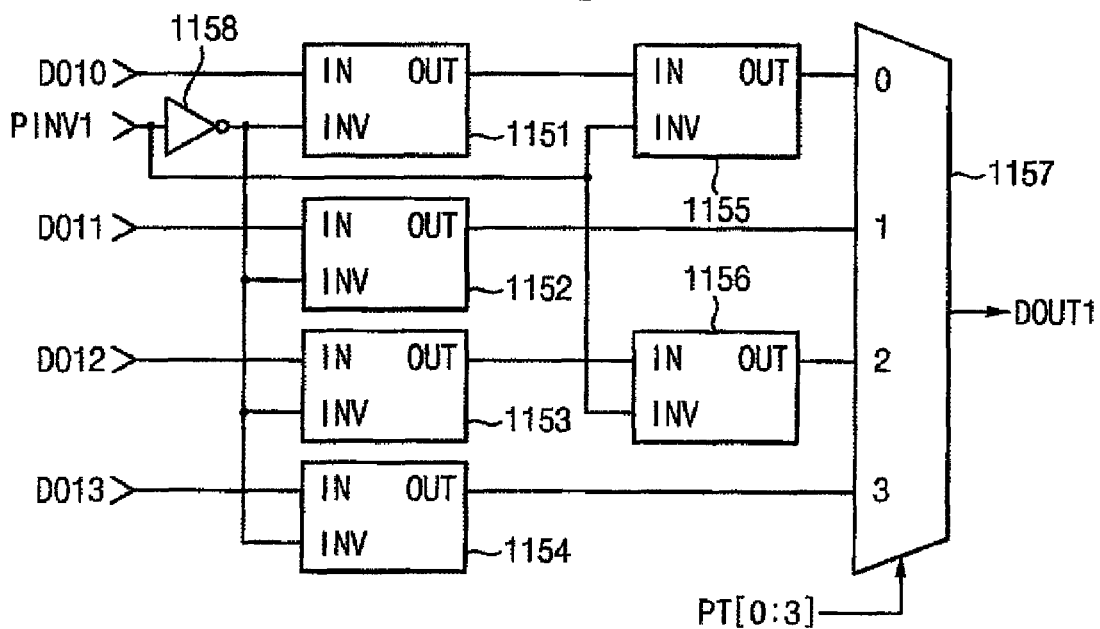

Referring to FIG. 13, the second serializer 1150 includes an inverter 1158, first through sixth transmission circuits 1151 through 1156, and a selection circuit 1157. The inverter 1158 inverts the first inversion signal PINV1. The first transmission circuit 1151 operates in response to the output signal of the inverter 1158. The first transmission circuit 1151 generates first output data without inverting the fifth data DO10 when the first inversion signal PINV1 is enabled. The second transmission circuit 1152 operates in response to the output signal of the inverter 1158. The second transmission circuit 1152 generates second output data without inverting the sixth data DO11 when the first inversion signal PINV1 is enabled. The third transmission circuit 1153 operates in response to the output signal of the inverter 1158. The third transmission circuit 1153 generates third output data without inverting the seventh data DO12 when the first inversion signal PINV1 is enabled. The fourth transmission circuit 1154 operates in response to the output signal of the inverter 1158. The fourth transmission circuit 1154 generates fourth output data without inverting the eighth data DO13 when the first inversion signal PINV1 is enabled. The fifth transmission circuit 1155 inverts the first output data to output fifth output data, in response to the first inversion signal PINV1. The sixth transmission circuit 1156 inverts the third output data to output sixth output data, in response to the first inversion signal PINV1. The selection circuit 1157 sequentially outputs the fifth output data, the second output data, the sixth output data and the fourth output data, in response to the transmission clock signal PT[0:3]. The selection circuit 1157 may be implemented by a multiplexer.

The selection circuit 1157 sequentially outputs the fifth output data, the second output data, the sixth output data, and the fourth output data, in response to the transmission clock signal PT[0:3]. The selection circuit 1157 may be implemented by a multiplexer.

Figure 14:
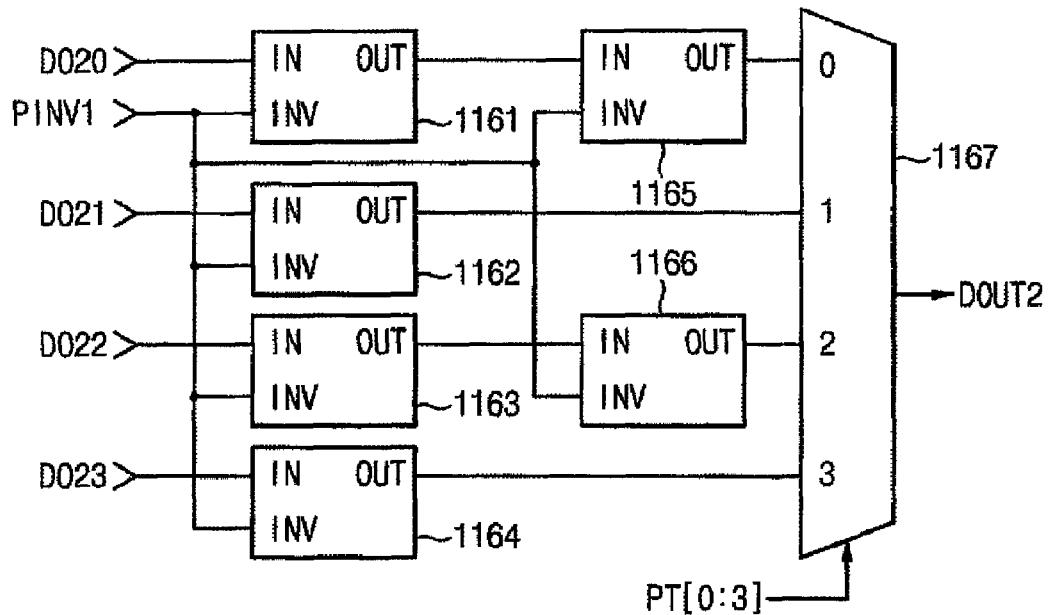

Referring to FIG. 14, the third serializer 1160 includes first through sixth transmission circuits 1161 through 1166, and a selection circuit 1167. The first transmission circuit 1161 inverts the ninth data DO20 to output first output data in response to the first inversion signal PINV1. The second transmission circuit 1162 inverts the tenth data DO21 to output second output data in response to the first inversion signal PINV1. The third transmission circuit 1163 inverts the eleventh data DO22 to output third output data in response to the first inversion signal PINV1. The fourth transmission circuit 1164 inverts the twelfth data DO23 to output fourth output data in response to the first inversion signal PINV1. The fifth transmission to circuit 1165 inverts the first output data to output fifth output data, in response to the first inversion signal PINV1. The sixth transmission circuit 1166 inverts the third output data to output sixth output data, in response to the first inversion signal PINV1. The selection circuit 1167 sequentially outputs the fifth output data, the second output data, the sixth output data, and the fourth output data, in response to the transmission clock signal PT[0:3]. The selection circuit 1167 may be implemented by a multiplexer.

Figure 15:
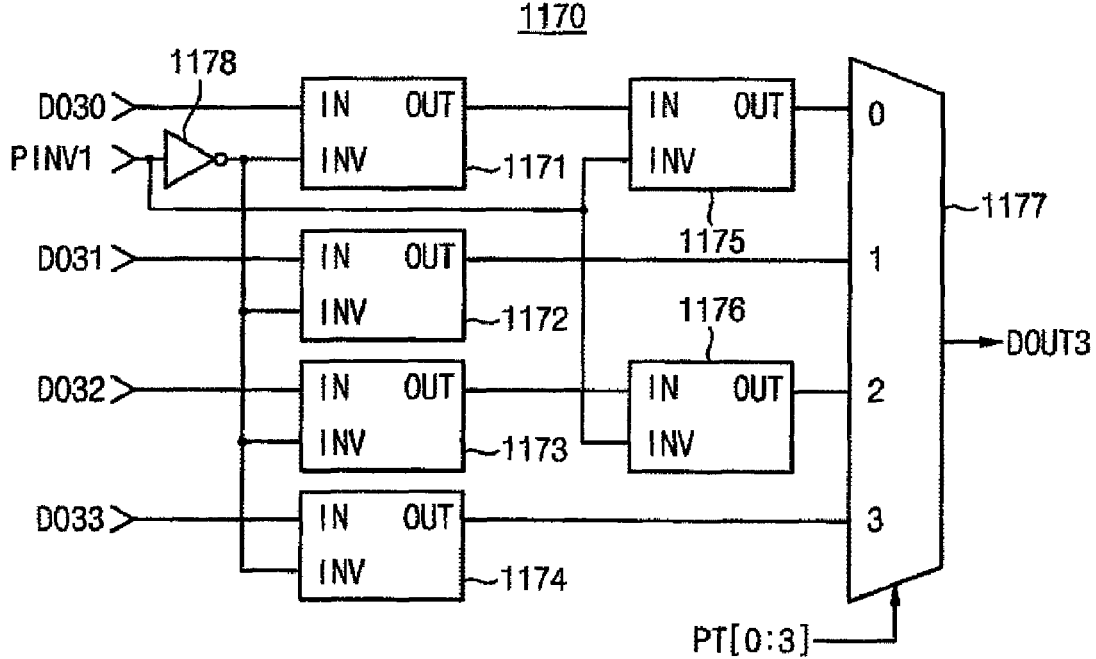

Referring to FIG. 15, the fourth serializer 1170 includes an inverter 1178, first through sixth transmission circuits 1171 through 1176, and a selection circuit 1177. The inverter 1178 inverts the first inversion signal PINV1. The first transmission circuit 1171 operates in response to the output signal of the inverter 1178. The first transmission circuit 1171 generates first output data without inverting the thirteenth data DO30 when the first inversion signal PINV1 is enabled. The second transmission circuit 1172 operates in response to the output signal of the inverter 1178. The second transmission circuit 1172 generates second output data without inverting the fourteenth data DO31 when the first inversion signal PINV1 is enabled. The third transmission circuit 1173 operates in response to the output signal of the inverter 1178. The third transmission circuit 1173 generates third output data without inverting the fifteenth data DO32 when the first inversion signal PINV1 is enabled. The fourth transmission circuit 1174 operates in response to the output signal of the inverter 1178. The fourth transmission circuit 1174 generates fourth output data without inverting the sixteenth data DO33 when the first inversion signal PINV1 is enabled. The fifth transmission circuit 1175 inverts the first output data to output fifth output data, in response to the first inversion signal PINV1. The sixth transmission circuit 1176 inverts the third output data to output sixth output data, in response to the first inversion signal PINV1. The selection circuit 1177 sequentially outputs the fifth output data, the second output data, the sixth output data and the fourth output data, in response to the transmission clock signal PT[0:3]. The selection circuit 1177 may be implemented is by a multiplexer.

Hereinafter, an operation of the serializing circuit 1130 will be explained with reference to FIGS. 11 through 15.

The serializing circuit 1130 performs a converting operation on the first transmission data DO00 through DO03, DO10 through DO13, DO20 through DO23, and DO30 through DO33 that are provided from the sixteen data lines LI1 through LI16 and that are parallel. The serializing circuit 1130 generates the second transmission data DOUT0 through DOUT3 that are serial. For example, the first transmission data, which the first serializer 1140 receives, may be the data D0 in FIG. 5; the first transmission data, which the second serializer 1150 receives, may be the data D1 in FIG. 5; the first transmission data, which the third serializer 1160 receives, may be the data D2 in FIG. 5; and the first transmission data, which the fourth serializer 1170 receives, may be the data D3 in FIG. 5. Each of the data D0 through D3 has twelve data (e.g., bits) that are sequentially transmitted.

Referring to FIG. 11, the serializers 1140 through 1170 may convert four data of each of the data D0 through D3 at once. Thus, the converting operation is required to be performed three times in order that the twelve data are converted. For example, the first transmission data DO00 through DO03 provided to the first serializer 1140 may be four bits of the twelve bits shown in data D0 in FIG. 5.

Referring to FIGS. 12 through 15, the serializers 1140, 1150, 1160 and 1170 sequentially output four data DOUT0 through DOUT3, respectively, in response to the transmission clock signal PT[0:3]. Therefore, the first serializer 1140 performs the converting operation on the first through fourth data DO00 through DO03 of the first transmission data from the first through fourth data lines LI1 through LI4 to output the first data DOUT0 of the second transmission data. The first data DOUT0 of the second transmission data are sequentially output through the first output data line LO1 during four cycles according to the transmission clock signal PT[0:3].

Referring to FIGS. 11 and 12, the first through fourth transmission circuits 1141 through 1144 invert the first through fourth data DO00 through DO03, respectively, from the first through fourth data lines LI1 through LI4, in response to the first inversion signal PINV1. The fifth transmission circuit 1145 inverts an output signal of the first transmission circuit 1141, and the sixth transmission circuit 1146 inverts an output signal of the third transmission circuit 1143. Therefore, the first through fourth transmission circuits 1141 through 1144 invert all data provided from the first through fourth data lines LI1 through LI4, and the fifth and sixth transmission circuits 1145 and 1146 invert odd-numbered data provided from the first through fourth transmission circuits 1141 through 1144

Referring to FIGS. 11 and 13, the first through fourth transmission circuits 1151 through 1154 perform the converting operation in response to a signal which is inverted from the first inversion signal PINV1 provided from the inverter 1158, and thus do not invert the fifth through eighth data DO10 through DO13, respectively, from the fifth through eighth data lines LI5 through LI8 when the first inversion signal PINV1 is enabled. The fifth transmission circuit 1155 inverts an output signal of the first transmission circuit 1151, and the sixth transmission circuit 1156 inverts an output signal of the third transmission circuit 1153 when the first inversion signal PINV1 is enabled. Therefore, the first through fourth transmission circuits 1151 through 1154 do not invert any data provided from the fifth through eighth data lines LI5 through LI8, and the fifth and sixth transmission circuits 1155 and 1156 invert odd-numbered data provided from the first through fourth transmission circuits 1141 through 1144.

Referring to FIGS. 11 and 14, the first through fourth transmission circuits 1161 through 1164 invert the ninth through twelfth data DO20 through DO23, respectively, from the ninth through twelfth data lines LI9 through LI12 in response to the first inversion signal PINV1. The fifth transmission circuit 1165 inverts an output signal of the first transmission circuit 1161, and the sixth transmission circuit 1166 inverts an output signal of the third transmission circuit 1163. Therefore, the first through fourth transmission circuits 1161 through 1164 invert all data provided from the ninth through twelfth data lines LI9 through LI12, and the fifth and sixth transmission circuits 1165 and 1166 invert odd-numbered data provided from the first through fourth transmission circuits 1161 through 1164.

Referring to FIGS. 11 and 15, the first through fourth transmission circuits 1171 through 1174 perform the converting operation in response to a signal inverted from the first inversion signal PINV1 provided from the inverter 1178, and thus do not invert the thirteenth through sixteenth data DO30 through DO33, respectively, from the thirteenth through sixteenth data lines LI13 through LI16 when the first inversion signal PINV1 is enabled. The fifth transmission circuit 1175 inverts an output signal of the first transmission circuit 1171, and the sixth transmission circuit 1176 inverts an output signal of the third transmission circuit 1173. Therefore, the first through fourth transmission circuits 1171 through 1174 do not invert any data provided from the thirteenth through sixteenth data lines LI13 through LI16, and the fifth and sixth transmission circuits 1175 and 1176 invert odd-numbered data provided from the first through fourth transmission circuits 1171 through 1174.

Referring to FIGS. 12 through 15, resulting data obtained by the converting operation using the first through fourth transmission circuits 1141 through 1144, 1151 through 1154, 1161 through 1164 and 1171 through 1174 are as illustrated in FIG. 6. Resulting data obtained by the converting operation using the fifth through sixth transmission circuits 1145 through 1146, 1155 through 1156, 1165 through 1166, and 1175 through 1176 are as illustrated in FIG. 7. Therefore, the semiconductor memory system 1000 of FIG. 8 is not susceptible to errors caused by ISI and SSN, as illustrated in FIG. 7, when the partial data inversion using the serializing circuit of FIG. 11 is performed.

Figure 16:
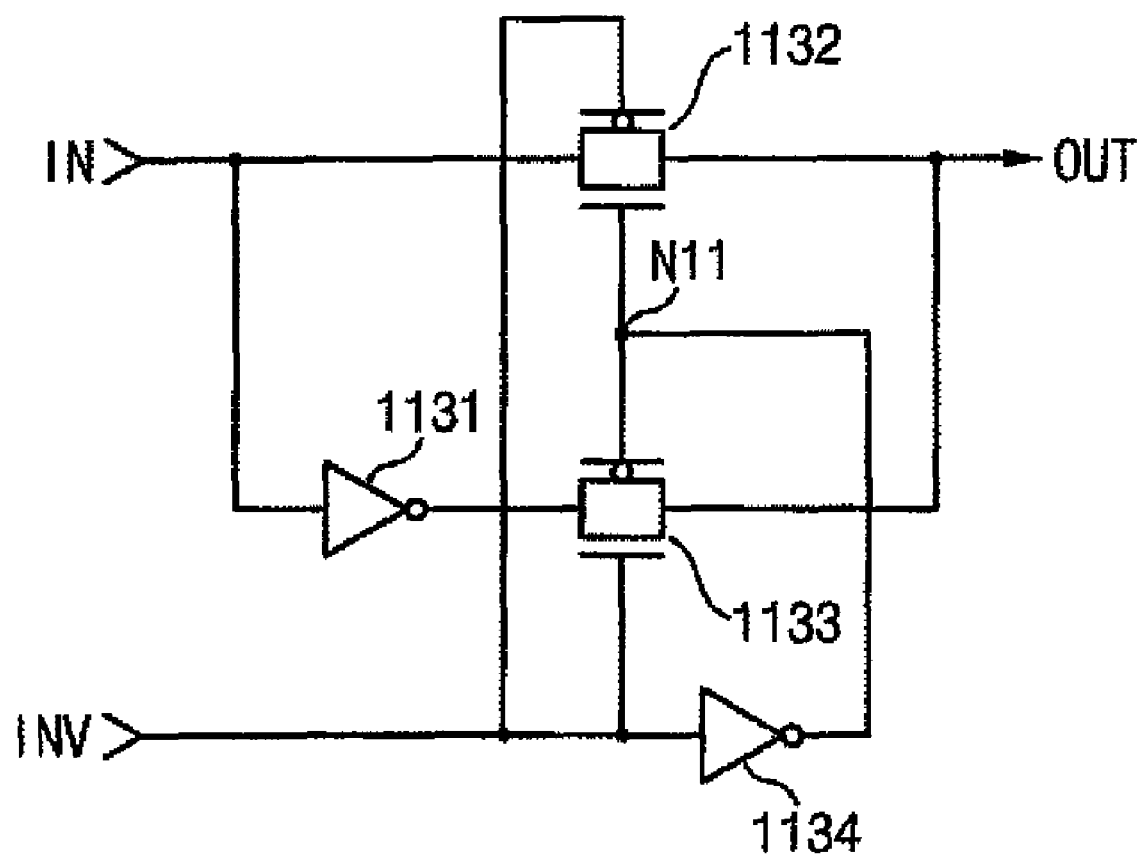
FIG. 16 is a circuit diagram illustrating examples of transmission circuits in FIGS. 12 through 15, according to exemplary embodiments of the present invention.

FIG. 16 is a circuit diagram illustrating an example of the transmission circuits depicted in FIGS. 12 through 15, according to an exemplary embodiment of the present invention. Referring to FIG. 16, the transmission circuit includes inverters 1131 and 1134, and transmission gates 1132 and 1133. An input data IN corresponds to the first data DO00 of the first transmission data of FIG. 12, for example. An inversion signal INV corresponds to the first inversion signal PINV1 of FIG. 12, for example. An output data OUT corresponds to the first data DOUT0 of the second transmission data provided from the first transmission circuit 1141, for example.

The inverter 1131 inverts the input data IN, and the inverter 1134 inverts the inversion signal INV. The transmission gate 1132, which receives the input data IN, outputs the output data OUT when the inversion signal INV is disabled. The transmission gate 1133, which receives data inverted from the input data IN through the inverter 1131, outputs the output data OUT when the inversion signal INV is enabled.

It is understood that, although FIG. 16 is discussed with reference to the transmission circuit 1141 of FIG. 12, a circuit structure of each of the transmission circuits included in the serializing circuit 1130 in FIG. 11, and depicted in FIGS. 12 through 15, may be same as a circuit structure of the circuit of FIG. 16, so the description will not be repeated for each.

Figure 17:
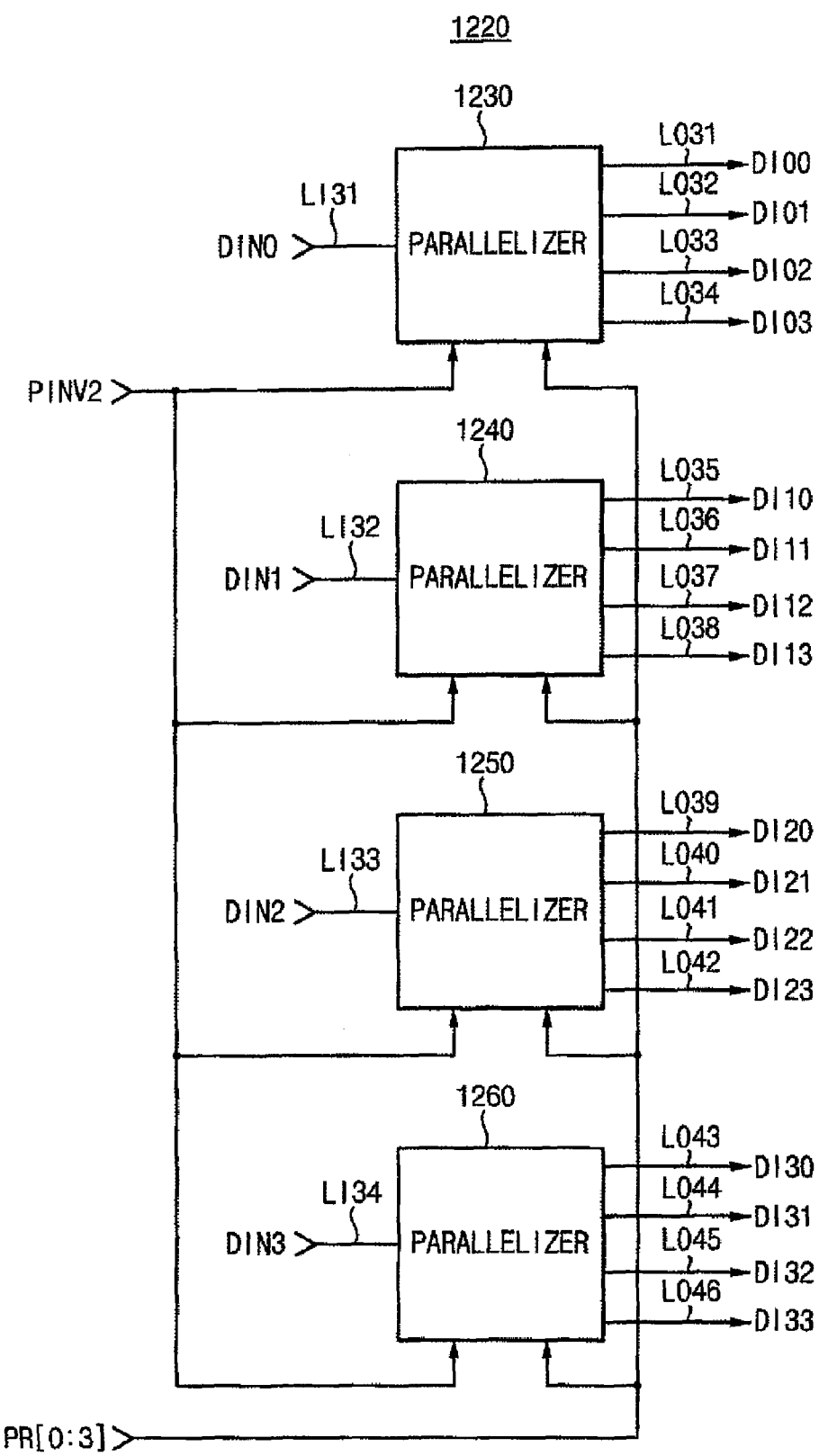
FIG. 17 is a block diagram illustrating an example of a parallelizing circuit included in the semiconductor memory system in FIG. 8, according to an exemplary embodiment of the present invention.

FIG. 17 is a block diagram illustrating an example of the parallelizing circuit 1220 included in the semiconductor memory system 1000 in FIG. 8, according to an exemplary embodiment of the present invention. Referring to FIG. 17, the parallelizing circuit 1220 includes first through fourth parallelizers 1230, 1240, 1250 and 1260.

The first parallelizer 1230 parallelizes first data DIN0 of the first reception data provided from a first communication channel LI31 to generate first through fourth data DI00 through DI03 of the second reception data, in response to the second inversion signal PINV2 and the reception clock signal PR[0:3]. The first through fourth data DI00 through DI03 of the second reception data are output through data lines LO31 through LO34, respectively.

The second parallelizer 1240 parallelizes second data DIN1 of the first reception data provided from a second communication channel LI32 to generate fifth through eighth data DI10 through DI13 of the second reception data, in response to the second inversion signal PINV2 and the reception clock signal PR[0:3]. The fifth through eighth data DI10 through DI13 of the second reception data are output through data lines LO35 through LO38, respectively.

The third parallelizer 1250 parallelizes third data DIN2 of the first reception data provided from a third communication channel LI33 to generate ninth through twelfth data DI20 through DI23 of the second reception data, in response to the second inversion signal PINV2 and the reception clock signal PR[0:3]. The ninth through twelfth data DI20 through DI23 of the second reception data are output through data lines LO39 through LO42, respectively.

The fourth parallelizer 1260 parallelizes fourth data DIN3 of the first reception data provided from a fourth communication channel LI34 to generate thirteenth through sixteenth data DI30 through DI33 of the second reception data, in response to the second inversion signal PINV2 and the reception clock signal PR[0:3]. The thirteenth through sixteenth data DI30 through DI33 of the second reception data are output through data lines LO43 through LO46, respectively.

FIGS. 18 through 21 are circuit diagrams illustrating examples of the parallelizers 1230, 1240, 1250 and 1260 in the parallelizing circuit 1220 in FIG. 17, according to exemplary embodiments of the present invention.

Figure 18:
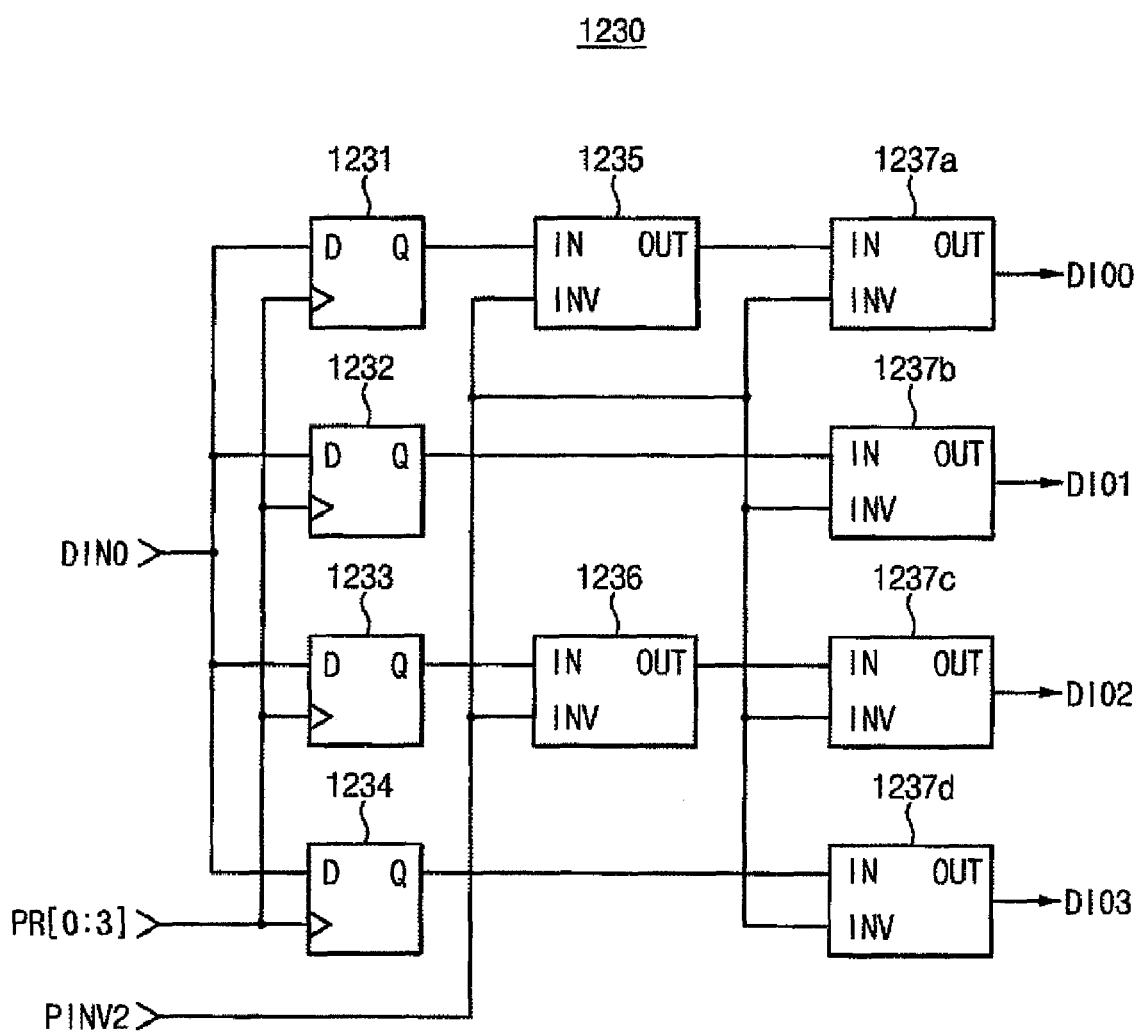
FIGS. 18 through 21 are circuit diagrams illustrating examples of parallelizers in the parallelizing circuit in FIG. 17, according to exemplary embodiments of the present invention.

Referring to FIG. 18, the first parallelizer 1230 includes D flip-flops 1231 through 1234, and transmission circuits 1235, 1236 and 1237a through 1237d. The first D flip-flop 1231 latches the first data DIN0 to output first output data in response to a first cycle of the reception clock signal PR[0:3]. The second D flip-flop 1232 latches the first data DIN0 to output second output data in response to a second cycle of the reception clock signal PR[0:3]. The third D flip-flop 1233 latches the first data DIN0 to output third output data in response to a third cycle of the reception clock signal PR[0:3]. The fourth D flip-flop 1234 latches the first data DIN0 to output fourth output data in response to a fourth cycle of the reception clock signal PR[0:3].

The first transmission circuit 1235 inverts the first output data to output fifth output data in response to the second inversion signal PINV2. The second transmission circuit 1236 inverts the third output data to output sixth output data in response to the second inversion signal PINV2. The third transmission circuit 1237a inverts the fifth output data in response to the second inversion signal PINV2 to output the first data DI00 of the second reception data. The fourth transmission circuit 1237*b* inverts the second output data in response to the second inversion signal PINV2 to output the second data DI01 of the second reception data. The fifth transmission circuit 1237*c* inverts the sixth output data in response to the second inversion signal PINV2 to output the third data DI02 of the second reception data. The sixth transmission circuit 1237*d* inverts the fourth output data in response to the second inversion signal PINV2 to output the fourth data DI03 of the second reception data.

Figure 19:
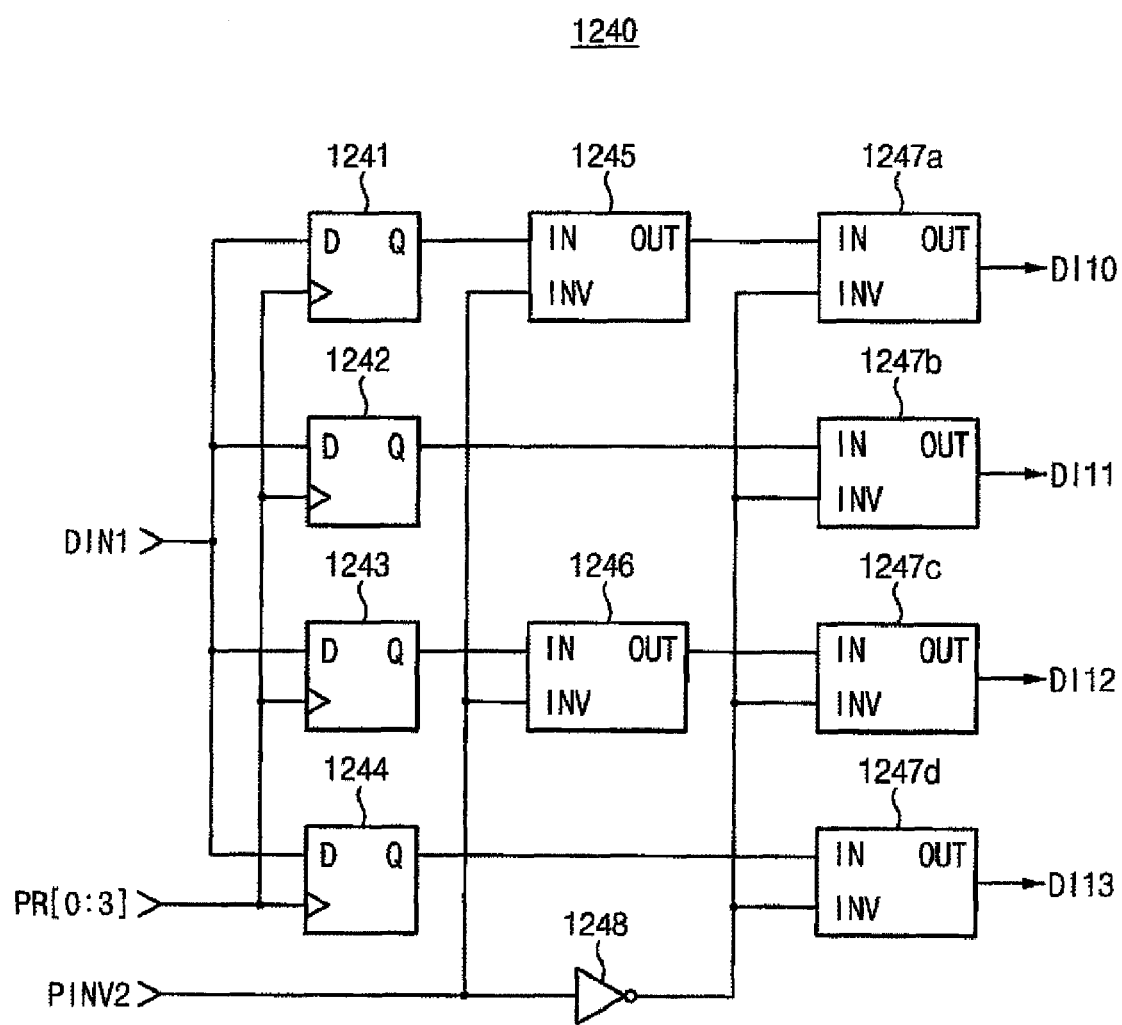

Referring to FIG. 19, the second parallelizer 1240 includes an inverter 1248, D flip-flops 1241 through 1244, and transmission circuits 1245, 1246 and 1247*a* through 1247*d*. The inverter 1248 inverts the second inversion signal PINV2.

The first D flip-flop 1241 latches the second data DIN1 to output first output data in response to the first cycle of the reception clock signal PR[0:3]. The second D flip-flop 1242 latches the second data DIN1 to output second output data in response to the second cycle of the reception clock signal PR[0:3]. The third D flip-flop 1243 latches the second data DIN1 to output third output data in response to the third cycle of the reception clock signal PR[0:3]. The fourth D flip-flop 1244 latches the second data DIN1 to output fourth output data in response to the fourth cycle of the reception clock signal PR[0:3].

The first transmission circuit 1245 inverts the first output data to output fifth output data in response to the second inversion signal PINV2. The second transmission circuit 1246 inverts the third output data to output sixth output data in response to the second inversion signal PINV2. The third transmission circuit 1247*a* performs a converting operation in response to the inverted second inversion signal provided from the inverter 1248, and thus does not invert the fifth output data to output the fifth data DI10 of the second reception data when the second inversion signal PINV2 is enabled. The fourth transmission circuit 1247*b* performs the converting operation in response to the inverted second inversion signal provided from the inverter 1248, and thus does not invert the second output data to output the sixth data DI11 of the second reception data when the second inversion signal PINV2 is enabled. The fifth transmission circuit 1247*c* performs the converting operation in response to the inverted second inversion signal provided from the inverter 1248, and thus does not invert the sixth output data to output the seventh data DI12 of the second reception data when the second inversion signal PINV2 is enabled. The sixth transmission circuit 1247*d* performs the converting operation in response to the inverted second inversion signal provided from the inverter 1248, and thus does not invert the fourth output data to output the eighth data DI13 of the second reception data when the second inversion signal PINV2 is enabled.

Figure 20:
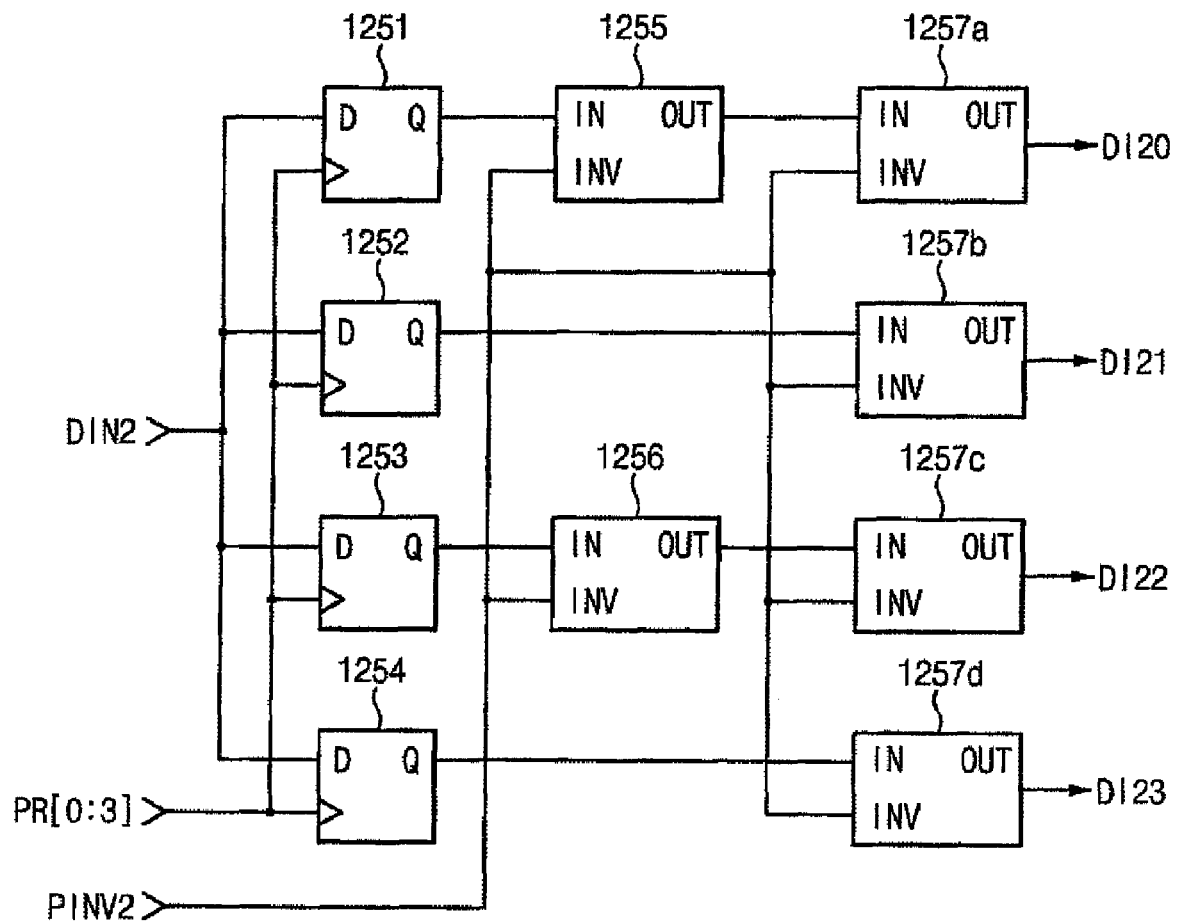

Referring to FIG. 20, the third parallelizer 1250 includes D flip-flops 1251 through 1254, and transmission circuits 1255, 1256 and 1257*a* through 1257*d*. The first D flip-flop 1251 latches the third data DIN2 to output first output data in response to the first cycle of the reception clock signal PR[0:3]. The second D flip-flop 1252 latches the third data DIN2 to output second output data in response to the second cycle of the reception clock signal PR[0:3]. The third D flip-flop 1253 latches the third data DIN2 to output third output data in response to the third cycle of the reception clock signal PR[0:3]. The fourth D flip-flop 1534 latches the third data DIN2 to output fourth output data in response to the fourth cycle of the reception clock signal PR[0:3].

The first transmission circuit 1255 inverts the first output data to output fifth output data in response to the second inversion signal PINV2. The second transmission circuit 1256 inverts the third output data to output sixth output data in response to the second inversion signal PINV2. The third transmission circuit 1257*a* inverts the fifth output data in response to the second inversion signal PINV2 to output the ninth data DI20 of the second reception data. The fourth transmission circuit 1257*b* inverts the second output data in response to the second inversion signal PINV2 to output the tenth data DI21 of the second reception data. The fifth transmission circuit 1257*c* inverts the sixth output data in response to the second inversion signal PINV2 to output the eleventh data DI22 of the second reception data. The sixth transmission circuit 1257*d* inverts the fourth output data in response to the second inversion signal PINV2 to output the twelfth data DI23 of the second reception data.

Figure 21:
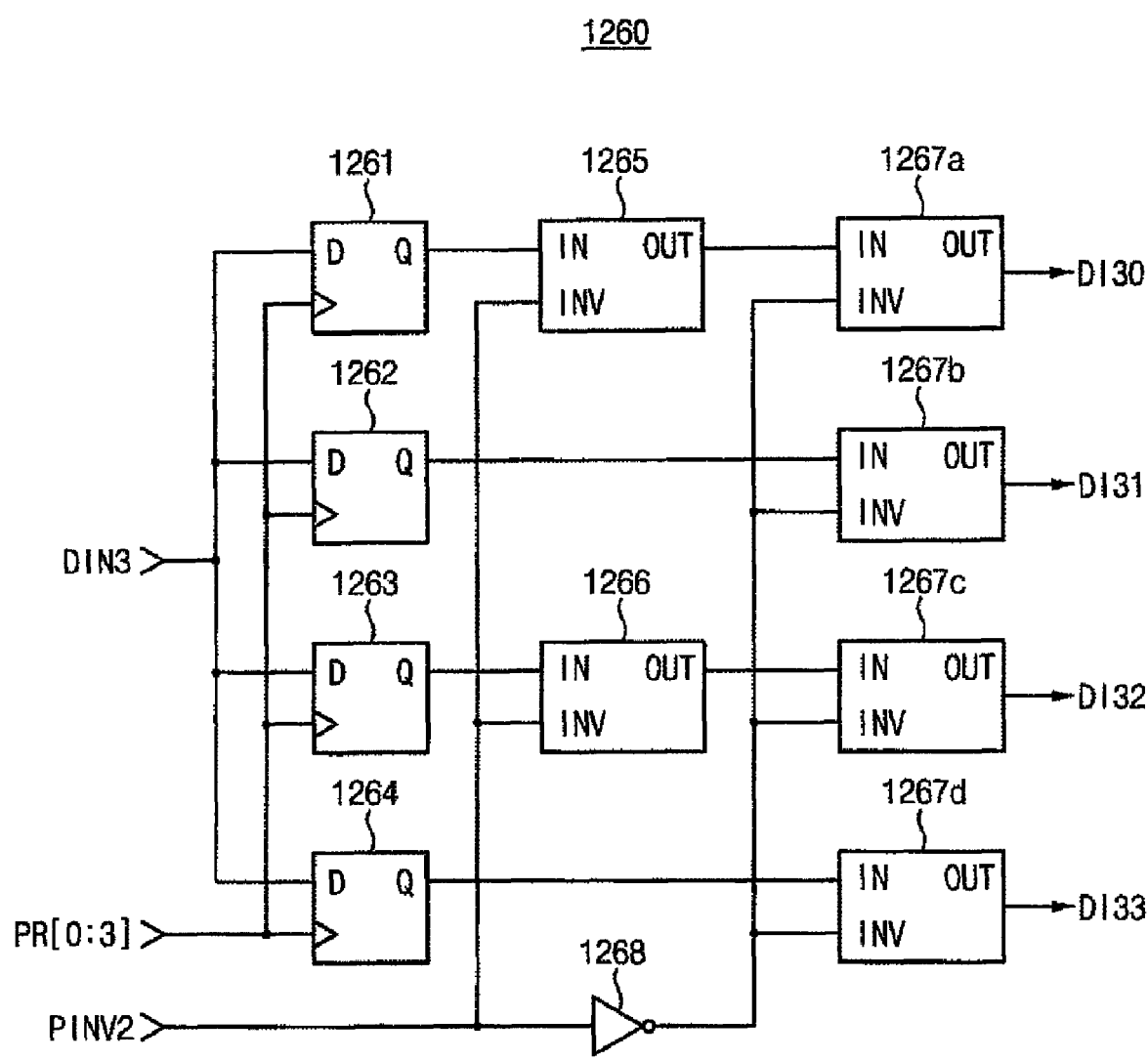

Referring to FIG. 21, the fourth parallelizer 1260 includes an inverter 1268, D flip-flops 1261 through 1264, and transmission circuits 1265, 1266 and 1267*a* through 1267*d*. The inverter 1268 inverts the second inversion signal PINV2.

The first D flip-flop 1261 latches the fourth data DIN3 to output first output data in response to the first cycle of the reception clock signal PR[0:3]. The second D flip-flop 1262 latches the fourth data DIN3 to output second output data in response to the second cycle of the reception clock signal PR[0:3]. The third D flip-flop 1263 latches the fourth data DIN3 to output third output data in response to the third cycle of the reception clock signal PR[0:3]. The fourth D flip-flop 1264 latches the fourth data DIN3 to output fourth output data in response to the fourth cycle of the reception clock signal PR[0:3].

The first transmission circuit 1265 inverts the first output data to output fifth output data in response to the second inversion signal PINV2. The second transmission circuit 1266 inverts the third output data to output sixth output data in response to the second inversion signal PINV2. The third transmission circuit 1267*a* performs the converting operation in response to the inverted second inversion signal provided from the inverter 1268, and thus does not invert the fifth output data to output the thirteenth data DI30 of the second reception data when the second inversion signal PINV2 is enabled. The fourth transmission circuit 1267*b* performs the converting operation in response to the inverted second inversion signal provided from the inverter 1268, and thus does not invert the second output to data to output the fourteenth data DI31 of the second reception data when the second inversion signal PINV2 is enabled. The fifth transmission circuit 1267*c* performs the converting operation in response to the inverted second inversion signal provided from the inverter 1268, and thus does not invert the sixth output data to output the fifteenth data DI32 of the second reception data when the second inversion signal PINV2 is enabled. The sixth transmission circuit 1267*d* performs the converting operation in response to the inverted second inversion signal provided from the inverter 1268, and thus does not invert the fourth output data to output the sixteenth data DI33 of the second reception data when the second inversion signal PINV2 is enabled.

Hereinafter, an operation of the parallelizing circuit 1220 will be explained with reference to FIGS. 17 through 21.

The parallelizing circuit 1220 performs the converting operation on the first reception data DIN0 through DIN3, which are serial, provided from the four communication channels LI31 through LI34. The parallelizing circuit 1220 generates the second reception data DI00 through DI03, DI10 through DI13, DI20 through DI23, and DI30 through DI33, which are parallel and which each include sixteen data. Referring to FIGS. 18 through 21, each of the parallelizers 1230, 1240, 1250 and 1260 outputs four parallel data in the second reception data based on the first serial reception data DIN0 through DIN3 in response to the reception clock signal PR[0:3].

Referring to FIG. 18, for example, the D flip-flops 1231 through 1234 latch the first data DIN0 to output the latched first data. The first transmission circuit 1235 inverts an output signal of the D flip-flop 1231, and the second transmission circuit 1236 inverts an output signal of the D flip-flop 1233. The first transmission circuit 1235 corresponds to the fifth transmission circuit 1145 in FIG. 12, and the second transmission circuit 1236 corresponds to sixth transmission circuit 1146 in FIG. 12. The transmission circuits 1237a through 1237d correspond to the transmission circuits 1141 through 1144 in FIG. 12.

The parallelizers 1240, 1250 and 1260 illustrated in FIGS. 19 through 21 operate similarly to the parallelizer 1230, described above, so the description will not be repeated. Input data and output data of the parallelizers 1240, 1250 and 1260, however, are different from the input data and output data of the parallelizer 1230, as indicated in the respective figures.

Figure 22:
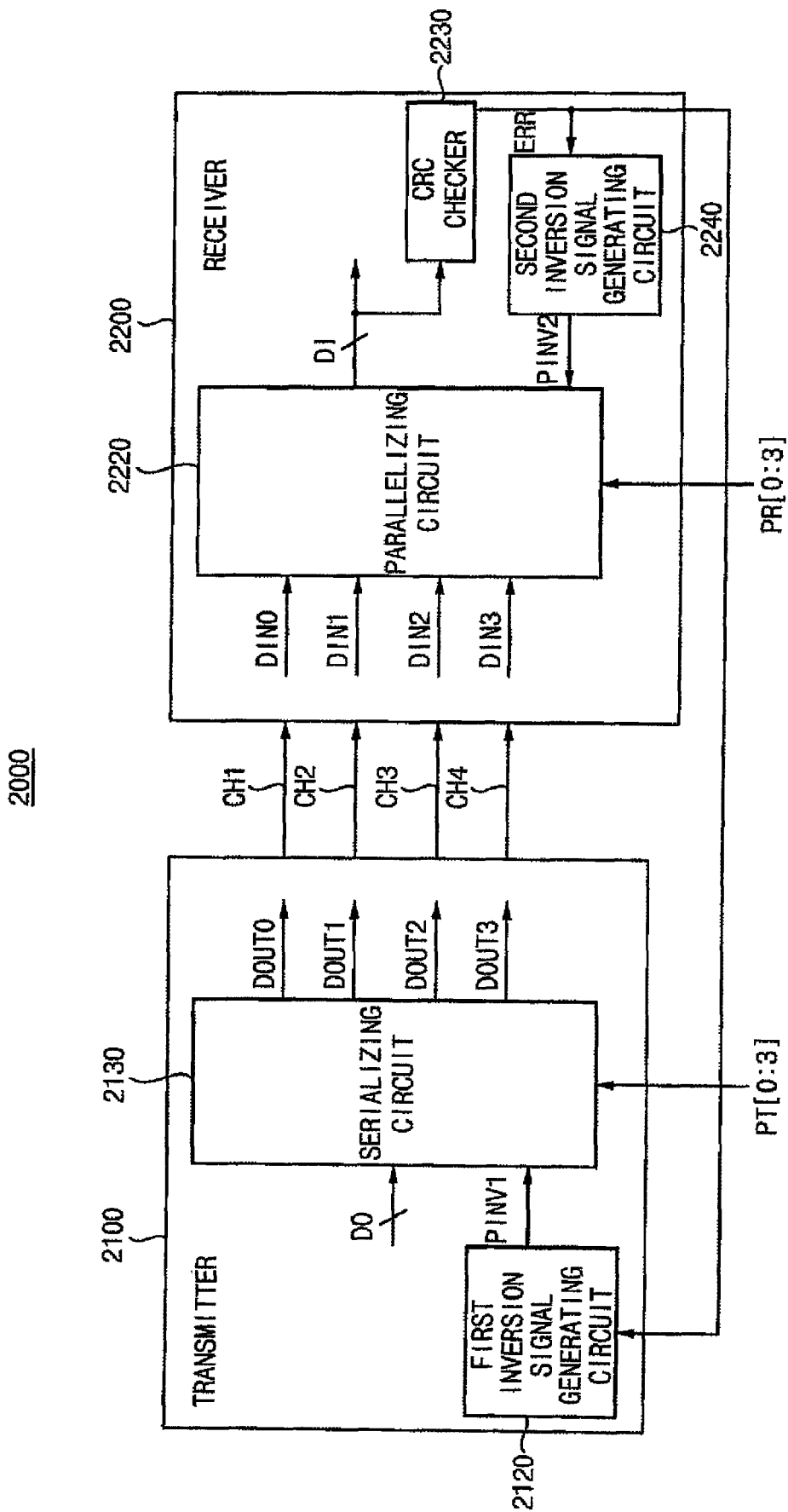
FIG. 22 is a block diagram illustrating a communication system, according to an exemplary embodiment of the present invention.

FIG. 22 is a block diagram illustrating a communication system according to an exemplary embodiment of the present invention. Referring to FIG. 22, the communication system 2000 includes a transmitter 2100 and a receiver 2200.

The transmitter 2100 inverts partial bits of first transmission data DO and serializes the converted first transmission data to provide second transmission data DOUT0 through DOUT3 to communication channels CH1 through CH4, in response to an error signal. The receiver 2200 inverts partial bits of first reception data DIN0 through DIN3 and parallelizes the converted first reception data to output second reception data DI, in response to the error signal ERR. Additionally, the receiver 2200 generates the error signal ERR based on the second reception data DI.

The transmitter 2100 includes a first inversion signal generating circuit 2120 and a serializing circuit 2130. The first inversion signal generating circuit 2120 generates a first inversion signal PINV1 in response to the error signal ERR. The serializing circuit 2130 inverts the partial bits of the first transmission data DO, and generates the second transmission data DOUT0 through DOUT3 by using the inverted bits and non-inverted bits of the first transmission data, in response to the first inversion signal PINV1 and a transmission clock signal PT[0:3].

The receiver 2200 includes a cyclic redundancy check (CRC) checker 2230, a second inversion signal generating circuit 2240, and a parallelizing circuit 2220. The CRC checker 2230 generates the error signal ERR based on the second reception data DI. The second inversion signal generating circuit 2240 generates a second inversion signal in response to the error signal ERR. The parallelizing circuit 2220 inverts the partial bits of the first reception data DIN0 through DIN3, and generates the second reception data DI by using the inverted bits and non-inverted bits of the first reception data, in response to the second inversion signal PINV2 and a reception clock signal PR[0:3].

Circuit structures of the transmitter 2100 and the receiver 2200 may be the same as the circuit structures of the memory device 1100 and the memory controller 1200 in FIG. 8, respectively. Also, an operation of the communication system 2000 in FIG. 22 is similar with the operation of the semiconductor memory system 1000 in FIG. 8. Thus, the description of the operation of the communication system 2000 will not be repeated.

As mentioned above, the communication system according to the exemplary embodiments of the present invention may not be susceptible to errors caused by ISI and SSN by performing partial data inversion, based on the transmission data at the transmitter and based on the reception data at the receiver.

While the present invention has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A communication system, comprising:
    a transmitter configured to invert a first plurality of bits of first transmission data, to serialize the first transmission data to generate second transmission data, and to provide the second transmission data to a plurality of communication channels, in response to an error signal; and
    a receiver configured to invert a first plurality of bits of first reception data provided from the plurality of communication channels, to parallelize the first reception data to generate second reception data, and to generate the error signal based on the second reception data, in response to the error signal.

2. The communication system of claim 1, wherein the transmitter comprises:
    a first inversion signal generating circuit configured to generate a first inversion signal in response to the error signal; and
    a serializing circuit configured to invert the first plurality of bits of the first transmission data, and to serialize the first transmission data to generate the second transmission data based on the inverted first plurality of bits and a non-inverted second plurality of bits of the first transmission data, in response to the error signal.

3. The communication system of claim 2, wherein the first transmission data corresponds to parallel data that are sequentially transmitted through a plurality of data lines.

4. The communication system of claim 3, wherein the serializing circuit inverts data transmitted through odd-numbered data lines of the plurality of data lines and inverts odd-numbered bits of data transmitted through each of the plurality of data lines, in response to the first inversion signal.

5. The communication system of claim 3, wherein the serializing circuit sequentially outputs the second transmission data in response to a transmission clock signal.

6. The communication system of claim 5, wherein the first transmission data comprises sixteen data that are transmitted through the plurality of data lines and the second transmission data comprises four data that are transmitted through the plurality of communication channels, each of the sixteen data comprising one bit and each of the four data comprising four bits.

7. The communication system of claim 6, wherein the serializing circuit comprises:
    a first serializer configured to serialize first through fourth data of the first transmission data provided from first through fourth data lines of the plurality of data lines to generate first data of the second transmission data in response to the first inversion signal and the transmission clock signal;
    a second serializer configured to serialize fifth through eighth data of the first transmission data provided from fifth through eighth data lines of the plurality of data lines to generate second data of the second transmission data in response to the first inversion signal and the transmission clock signal;
    a third serializer configured to serialize ninth through twelfth data of the first transmission data provided from ninth through twelfth data lines of the plurality of data lines to generate third data of the second transmission data in response to the first inversion signal and the transmission clock signal; and a fourth serializer configured to serialize thirteenth through sixteenth data of the first transmission data provided from the thirteenth through sixteenth data lines of the plurality of data lines to generate fourth data of the second transmission data in response to the first inversion signal and the transmission clock signal.

8. The communication system of claim 7, wherein each of the first through fourth serializers comprise a plurality of transmission circuits that invert data in response to the first inversion signal.

9. The communication system of claim 2, wherein the first inversion signal transits synchronously with edges of the error signal.

10. The communication system of claim 9, wherein the first inversion signal generating circuit comprises a flip-flop.

11. The communication system of claim 10, wherein the flip-flop comprises:
an input terminal;
a clock terminal receiving the error signal;
an output terminal providing the first inversion signal; and
a complementary output terminal providing an inverted first inversion signal, the input terminal and the complementary output terminal being electrically connected to each other.

12. The communication system of claim 1, wherein the receiver comprises:
a cyclic redundancy check (CRC) checker configured to check a CRC code based on the second reception data and to generate the error signal;
a second inversion signal generating circuit configured to generate a second inversion signal in response to the error signal; and
a parallelizing circuit configured to invert the first plurality of bits of the first reception data, and to parallelize the first reception data to generate the second reception data based on the inverted first plurality of bits and non-inverted second plurality of bits of the first reception data, in response to the error signal.

13. The communication system of claim 12, wherein the first reception data correspond to serial data that are sequentially transmitted through the plurality of communication channels.

14. The communication system of claim 13, wherein the parallelizing circuit is configured to invert odd-numbered bits of data transmitted through each of the communication channels and to invert odd-numbered and even-numbered bits of data transmitted through odd-numbered communication channels of the plurality of communication channels, in response to the second inversion signal.

15. The communication system of claim 13, wherein the parallelizing circuit outputs the second reception data in response to a reception clock signal.

16. The communication system of claim 15, wherein the first reception data comprises four data that are transmitted through four communication channels of the plurality of communications channels and the second reception data comprises sixteen data that are transmitted through sixteen output data lines, each of the four data comprising four bits and each the sixteen data comprising one bit.

17. The communication system of claim 16, wherein the parallelizing circuit comprises:
a first parallelizer configured to parallelize first data of the first reception data provided from a first channel of the plurality of communications channels to generate first through fourth data of the second reception data in response to the second inversion signal and the reception clock signal;
a second parallelizer configured to parallelize second data of the first reception data provided from a second channel of the plurality of communications channels to generate fifth through eighth data of the second reception data in response to the second inversion signal and the reception clock signal;
a third parallelizer configured to parallelize third data of the first reception data provided from a third channel of the plurality of communications channels to generate ninth through twelfth data of the second reception data in response to the second inversion signal and the reception clock signal; and
a fourth parallelizer configured to parallelize fourth data of the first reception data provided from a fourth channel of the plurality of communications channels to generate thirteenth through sixteenth data of the second reception data in response to the second inversion signal and the reception clock signal.

18. The communication system of claim 17, wherein the first through fourth parallelizers comprise a plurality of transmission circuits that invert data in response to the second inversion signal.

19. The communication system of claim 12, wherein the second inversion signal transits synchronously with edges of the error signal.

20. The communication system of claim 19, wherein the second inversion signal generating circuit comprises a flip-flop.

21. The communication system of claim 20, wherein the flip-flop comprises:
an input terminal;
a clock terminal receiving the error signal;
an output terminal providing the second inversion signal; and
a complementary output terminal providing an inverted second inversion signal, the input terminal and the complementary output terminal being electrically connected.

22. A memory system, comprising:
a memory device configured to invert a first plurality of bits of first transmission data, to serialize the first transmission data to generate second transmission data, and to provide the second transmission data to a plurality of communication channels, in response to an error signal; and
a memory controller configured to invert a first plurality of bits of first reception data provided from the plurality of communication channels, to parallelize the first reception data to generate second reception data, and to generate the error signal based on the second reception data, in response to the error signal.

23. The memory system of claim 22, wherein the memory device comprises:
a first inversion signal generating circuit configured to generate a first inversion signal in response to the error signal; and
a serializing circuit configured to invert the first plurality of bits of the first transmission data, and to serialize the first transmission data to generate the second transmission data based on the inverted first plurality of bits and a non-inverted second plurality of bits of the first transmission data, in response to the error signal.

24. The memory system of claim 23, wherein the first transmission data correspond to parallel data that are sequentially transmitted through a plurality of data lines.

25. The memory system of claim 24, wherein the serializing circuit inverts odd-numbered and even-numbered bits of data transmitted through odd-numbered data lines and inverts odd-numbered bits of data transmitted through each of the data lines, in response to the first inversion signal.

26. The memory system of claim 23, wherein the memory device further comprises:
 a memory core configured to generate the first transmission data to provide the first transmission data to the serializing circuits; and
 an output buffer configured to provide the second transmission data to the plurality of communication channels by buffering the second transmission data.

27. The memory system of claim 22, wherein the memory controller comprises:
 a cyclic redundancy check (CRC) checker configured to check a CRC code based on the second reception data and to generate the error signal;
 a second inversion signal generating circuit configured to generate a second inversion signal in response to the error signal; and
 a parallelizing circuit configured to invert the first plurality of bits of the first reception data, and configured to parallelize the first reception data to generate the second reception data based on the inverted first plurality of bits and a second plurality of non-inverted bits of the first reception data, in response to the error signal.

28. The memory system of claim 27, wherein the first reception data correspond to serial data that are sequentially transmitted through the plurality of communication channels.

29. The memory system of claim 28, wherein the parallelizing circuit inverts odd-numbered bits of data transmitted through each of the communication channels and inverts odd-numbered and even-numbered bits of data transmitted through odd-numbered communication channels of the plurality of communication channels, in response to the second inversion signal.

30. The memory system of claim 28, wherein the parallelizing circuit outputs the second reception data in response to a reception clock signal.

31. The memory system of claim 22, wherein the memory controller further comprises:
 an input buffer configured to provide the first reception data to the parallelizing circuits by buffering data provided from the plurality of communication channels; and
 a memory controller core configured to perform data processing based on the second reception data, and to generate control signals for controlling the memory device.

32. A method of controlling a communication system, comprising:
 generating a first inversion signal and a second inversion signal in response to an error signal;
 inverting a plurality of bits of first transmission data in response to the first inversion signal;
 generating second transmission data that are serialized based on at least the plurality of inverted bits and a plurality of non-inverted bits of the first transmission data;
 providing the second transmission data to a plurality of communication channels;
 receiving first reception data from the plurality of communication channels;
 inverting a plurality of bits of the first reception data in response to the second inversion signal;
 generating second reception data that are parallelized based on at least the plurality of inverted bits and a plurality of non-inverted bits of the first reception data; and
 generating the error signal based on the second reception data.

* * * * *